(12) United States Patent
Kobayashi et al.

(10) Patent No.: US 10,408,626 B2
(45) Date of Patent: Sep. 10, 2019

(54) INFORMATION PROCESSING APPARATUS, INFORMATION PROCESSING METHOD, AND PROGRAM

(71) Applicant: SONY CORPORATION, Tokyo (JP)

(72) Inventors: Yoshiyuki Kobayashi, Tokyo (JP); Masatomo Kurata, Tokyo (JP); Tomohisa Takaoka, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/308,550

(22) PCT Filed: May 27, 2015

(86) PCT No.: PCT/JP2015/002693
§ 371 (c)(1),
(2) Date: Nov. 2, 2016

(87) PCT Pub. No.: WO2015/194098
PCT Pub. Date: Dec. 23, 2015

(65) Prior Publication Data
US 2017/0074666 A1    Mar. 16, 2017

(30) Foreign Application Priority Data

Jun. 20, 2014 (JP) .................................. 2014-127385

(51) Int. Cl.
*G01C 21/20* (2006.01)
*G06F 16/951* (2019.01)
(Continued)

(52) U.S. Cl.
CPC ........... *G01C 21/206* (2013.01); *G01C 21/10* (2013.01); *G01C 22/006* (2013.01);
(Continued)

(58) Field of Classification Search
CPC ..... G01C 21/206; G01C 21/10; G01C 22/006
See application file for complete search history.

(56) References Cited

U.S. PATENT DOCUMENTS

| 2002/0111172 A1* | 8/2002 | DeWolf | G06Q 30/02 |
| | | | 455/456.3 |
| 2003/0101060 A1* | 5/2003 | Bickley | G10L 15/08 |
| | | | 704/275 |

(Continued)

FOREIGN PATENT DOCUMENTS

| CN | 104508426 A | 4/2015 |
| JP | 2004-227305 A | 8/2004 |

(Continued)

OTHER PUBLICATIONS

Jan-Keno Janssen, Wo bist'n du?—Geodienst: Google Latitude, C'T Mar. 2011, Jan. 17, 2011, pp. 86-88.

(Continued)

*Primary Examiner* — Jess Whittington
(74) *Attorney, Agent, or Firm* — Paratus Law Group, PLLC

(57) ABSTRACT

An information processing apparatus including a processing circuit configured to obtain activity recognition information which is determined on the basis of sensing information of a plurality of users, the activity recognition information indicating recognized activities of the plurality of users based on location information of the plurality of users, and generate information for displaying representations of the recognized activities of the plurality of users in relation to a map by using specified criteria.

18 Claims, 29 Drawing Sheets

(51) Int. Cl.
*G06Q 30/02* (2012.01)
*G01C 22/00* (2006.01)
*G09B 29/00* (2006.01)
*G01S 19/49* (2010.01)
*G01C 21/10* (2006.01)
*G01C 21/36* (2006.01)

(52) U.S. Cl.
CPC ............ *G01C 22/008* (2013.01); *G01S 19/49* (2013.01); *G06F 16/951* (2019.01); *G06Q 30/0201* (2013.01); *G09B 29/007* (2013.01); *G01C 21/3617* (2013.01)

(56) References Cited

U.S. PATENT DOCUMENTS

| | | | | |
|---|---|---|---|---|
| 2012/0044265 | A1* | 2/2012 | Khorashadi | G01C 21/206 345/641 |
| 2013/0014040 | A1* | 1/2013 | Jagannathan | G06Q 50/01 715/765 |
| 2013/0159234 | A1* | 6/2013 | Xing | H04M 1/72569 706/46 |
| 2013/0297198 | A1* | 11/2013 | Vande Velde | G01C 21/28 701/409 |
| 2013/0345978 | A1* | 12/2013 | Lush | G01C 21/00 701/533 |
| 2014/0365113 | A1* | 12/2014 | McGavran | G01C 21/00 701/425 |
| 2015/0088704 | A1* | 3/2015 | Votaw | G06Q 50/01 705/30 |
| 2015/0254275 | A1* | 9/2015 | Kikuchi | A63F 13/12 707/751 |
| 2016/0055236 | A1* | 2/2016 | Frank | G06Q 30/02 707/748 |

FOREIGN PATENT DOCUMENTS

| | | |
|---|---|---|
| JP | 2009-134280 A | 6/2009 |
| JP | 2011-108245 A | 6/2011 |
| JP | 2012-008771 A | 1/2012 |
| JP | 2013-003643 | 1/2013 |
| JP | 2013-509622 A | 3/2013 |
| JP | 2013-195671 A | 9/2013 |
| JP | 2013-535666 A | 9/2013 |
| JP | 2013-210870 A | 10/2013 |
| WO | WO 2011/065570 A1 | 6/2011 |

OTHER PUBLICATIONS

Angus K.Y. Wong, The Near-Me Area Network, *IEEE Internet Computing*, Mar./Apr. 2010, pp. 74-77, vol. 14.
Leonhard Becker, Die Verständnisvolle—iOS 6: Siri verbessert, neue Karten, weniger Google, Sep. 10, 2012, pp. 116-119. C'T 20/2012.
Apr. 3, 2018, Japanese Office Action issued for related JP Application No. 2014-127385.
Apr. 2, 2019, Chinese Office Action issued for related CN Application No. 201580026784.8.
Jun. 11, 2019, European Communication issued for related EP Application No. 15729584.1.

* cited by examiner

[Fig. 1]
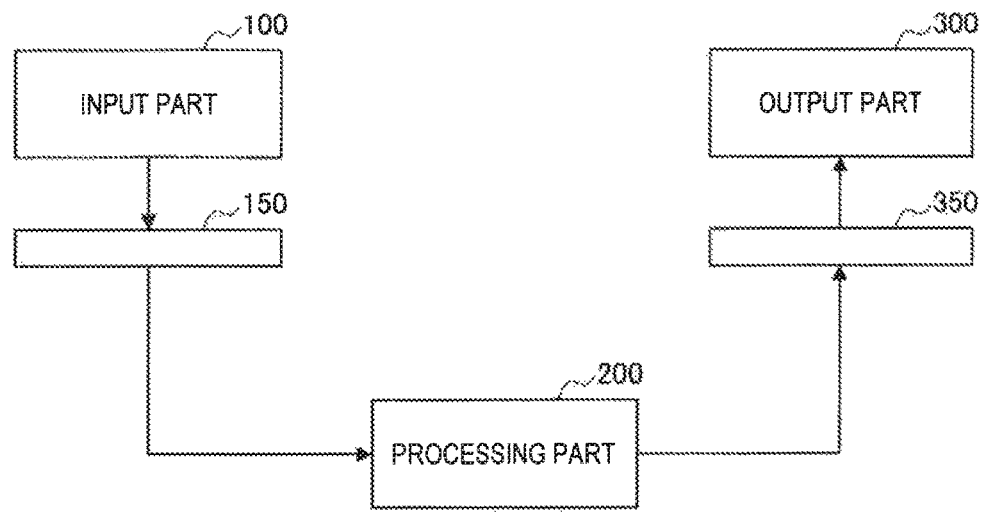
[Fig. 2A]
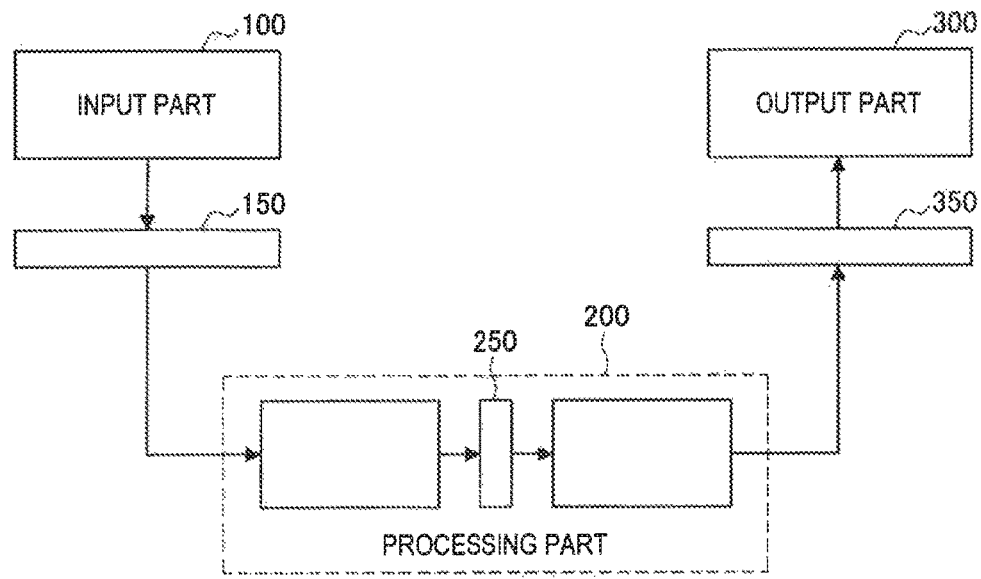

[Fig. 2B]
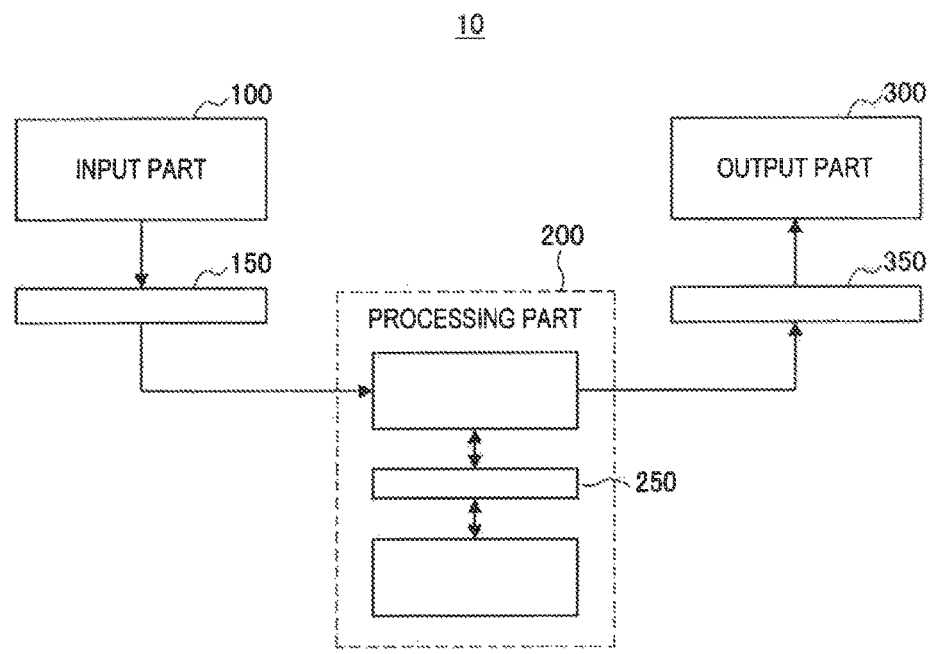

[Fig. 3]
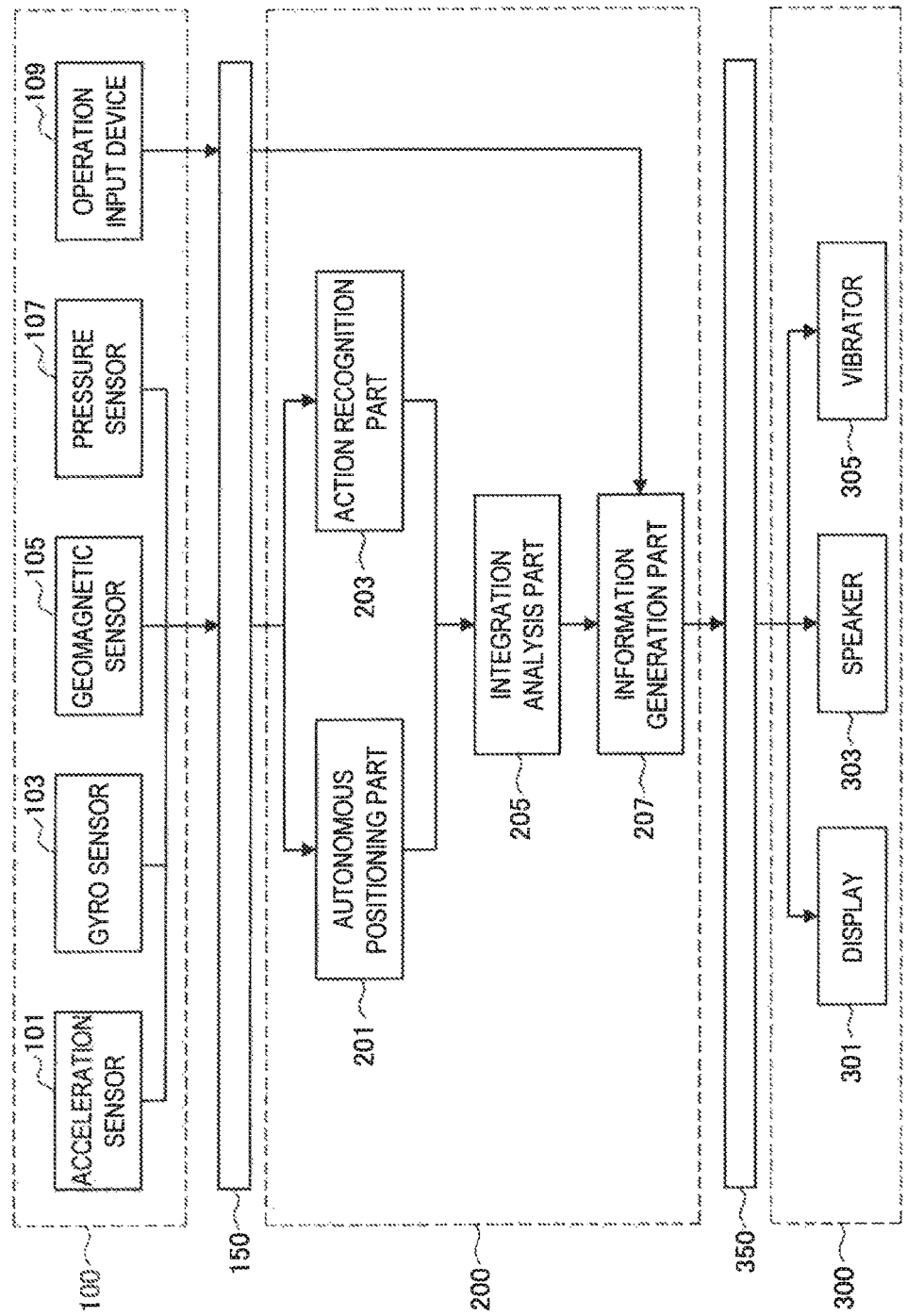

[Fig. 4]
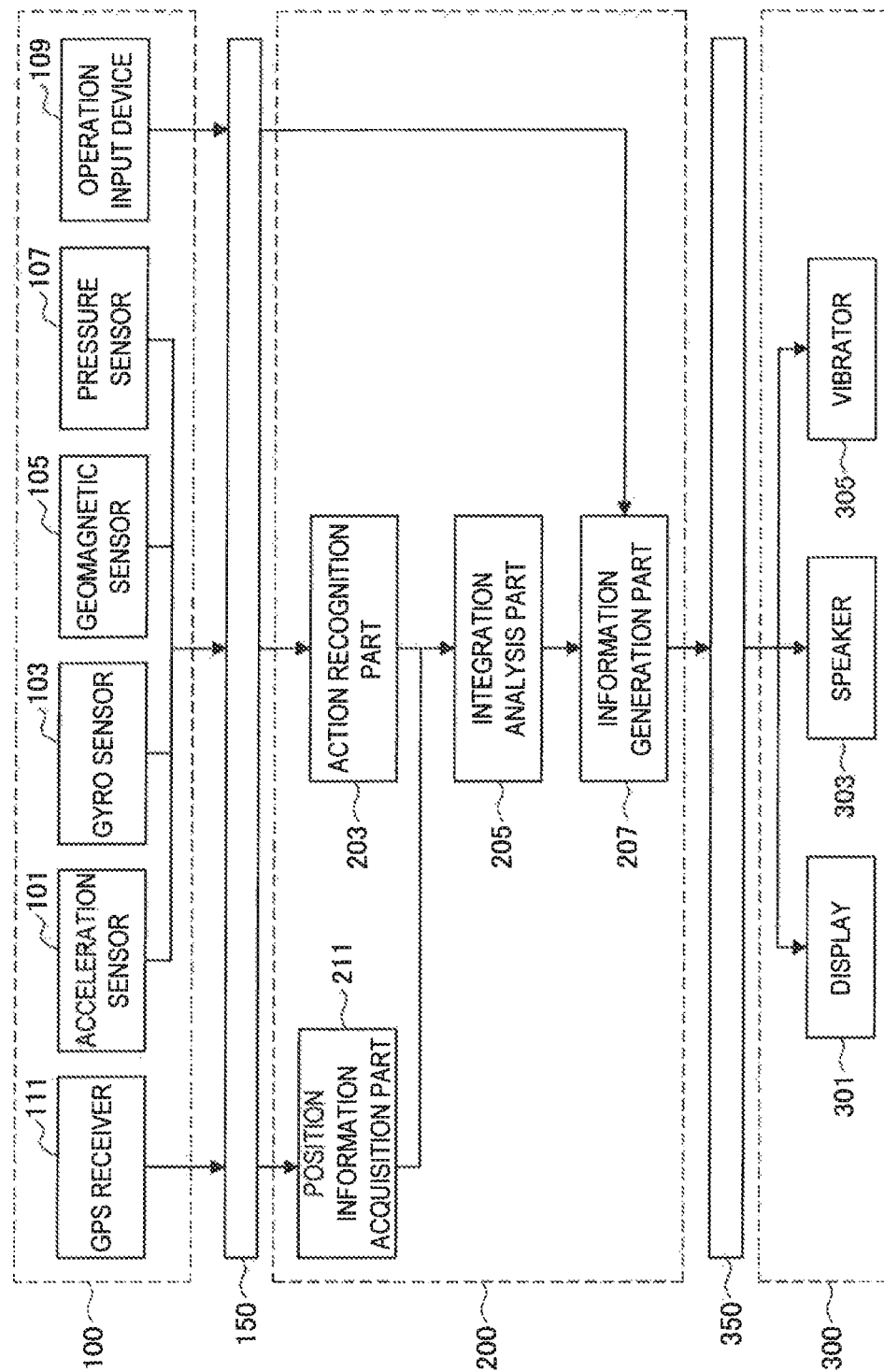

[Fig. 5]
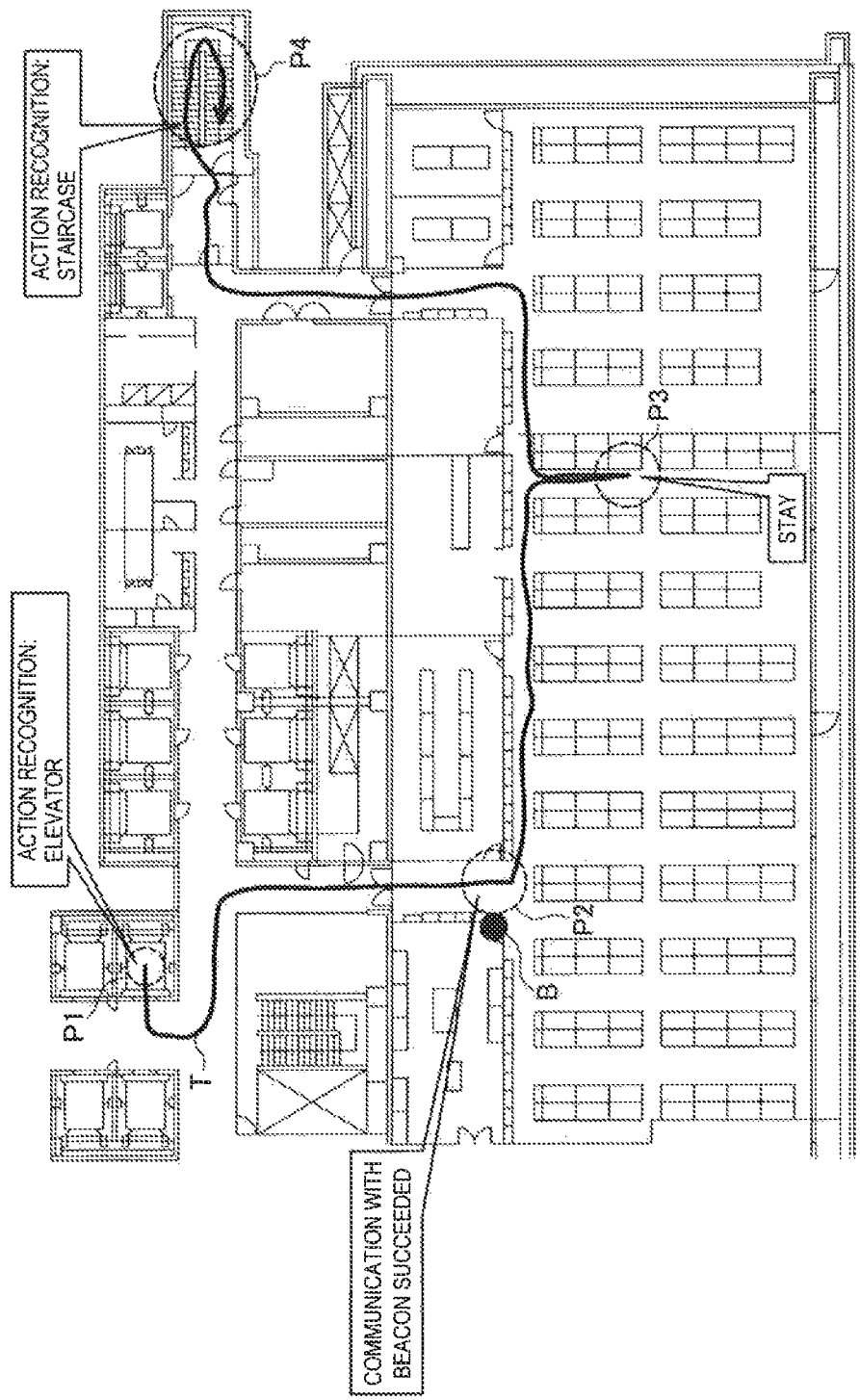

[Fig. 6]
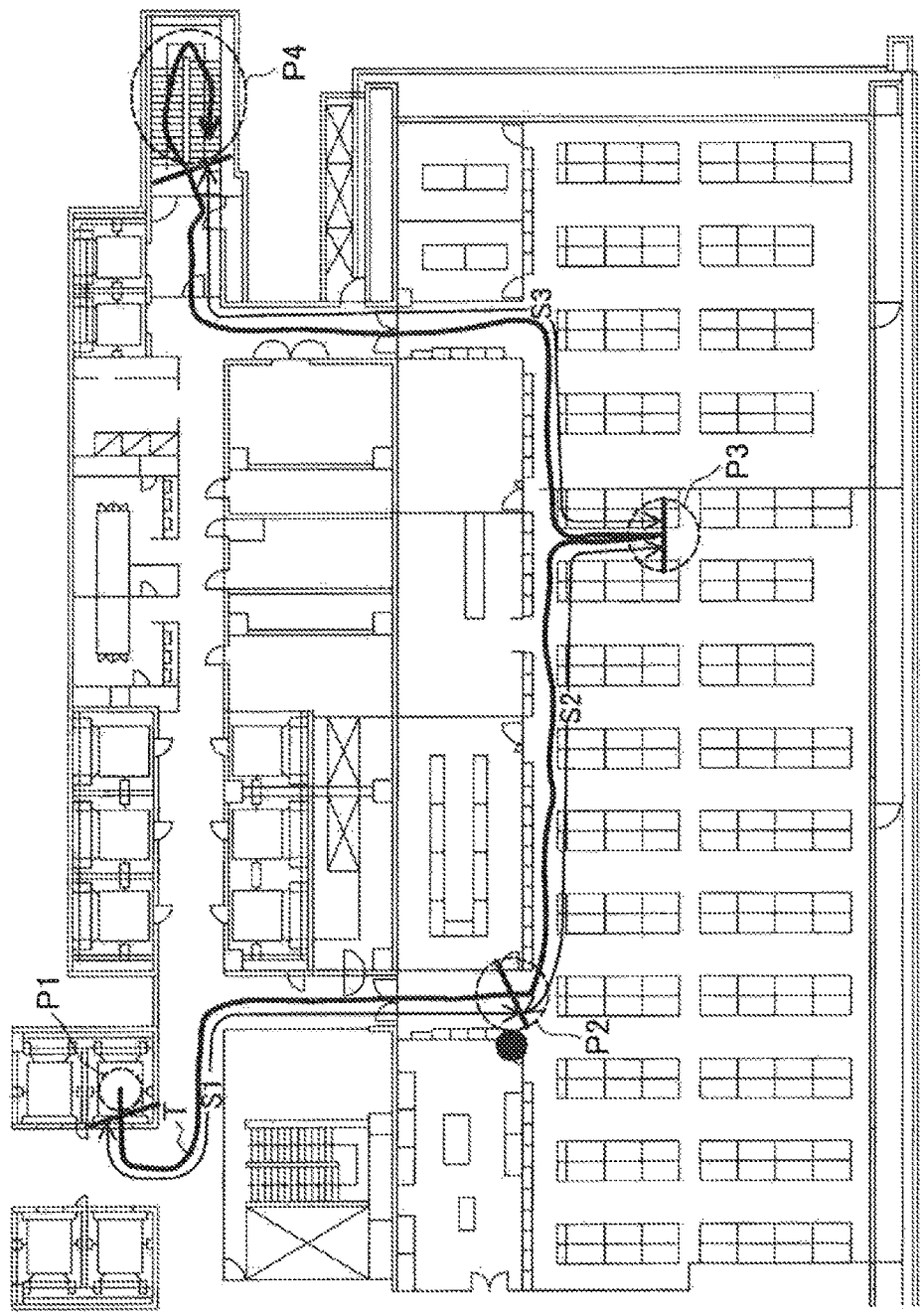

[Fig. 7]
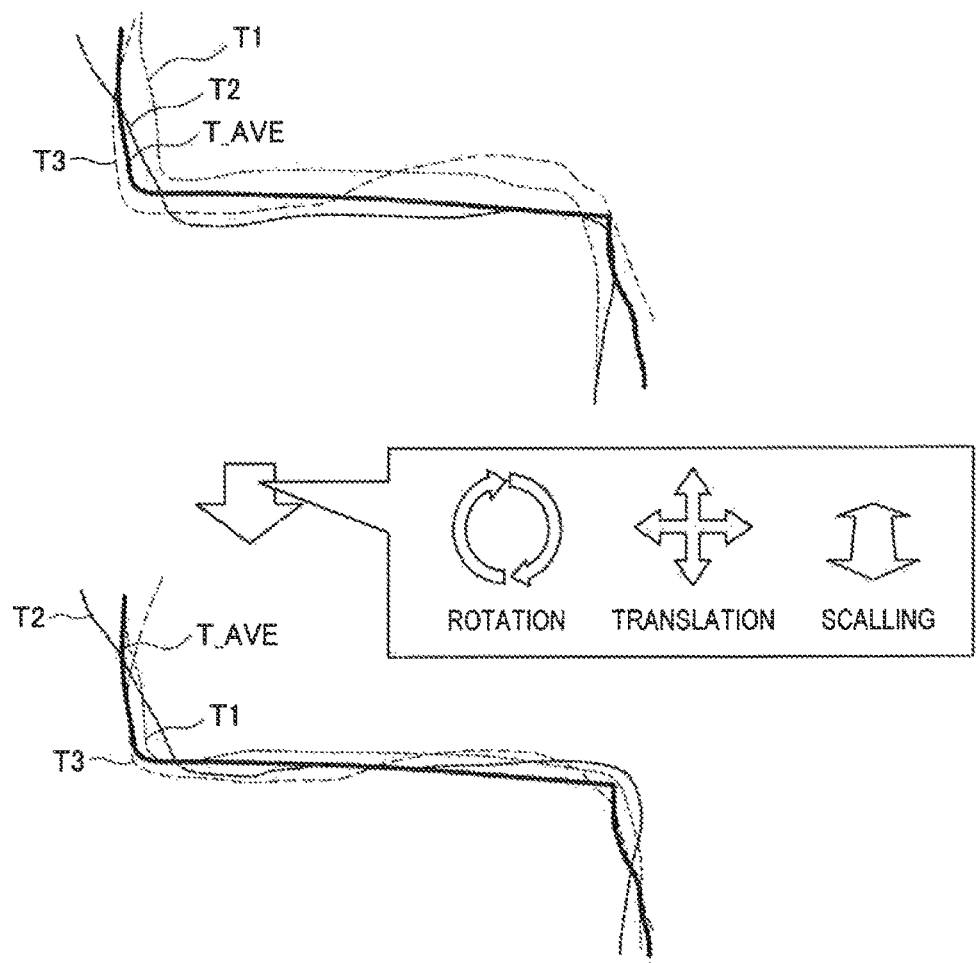

[Fig. 8]
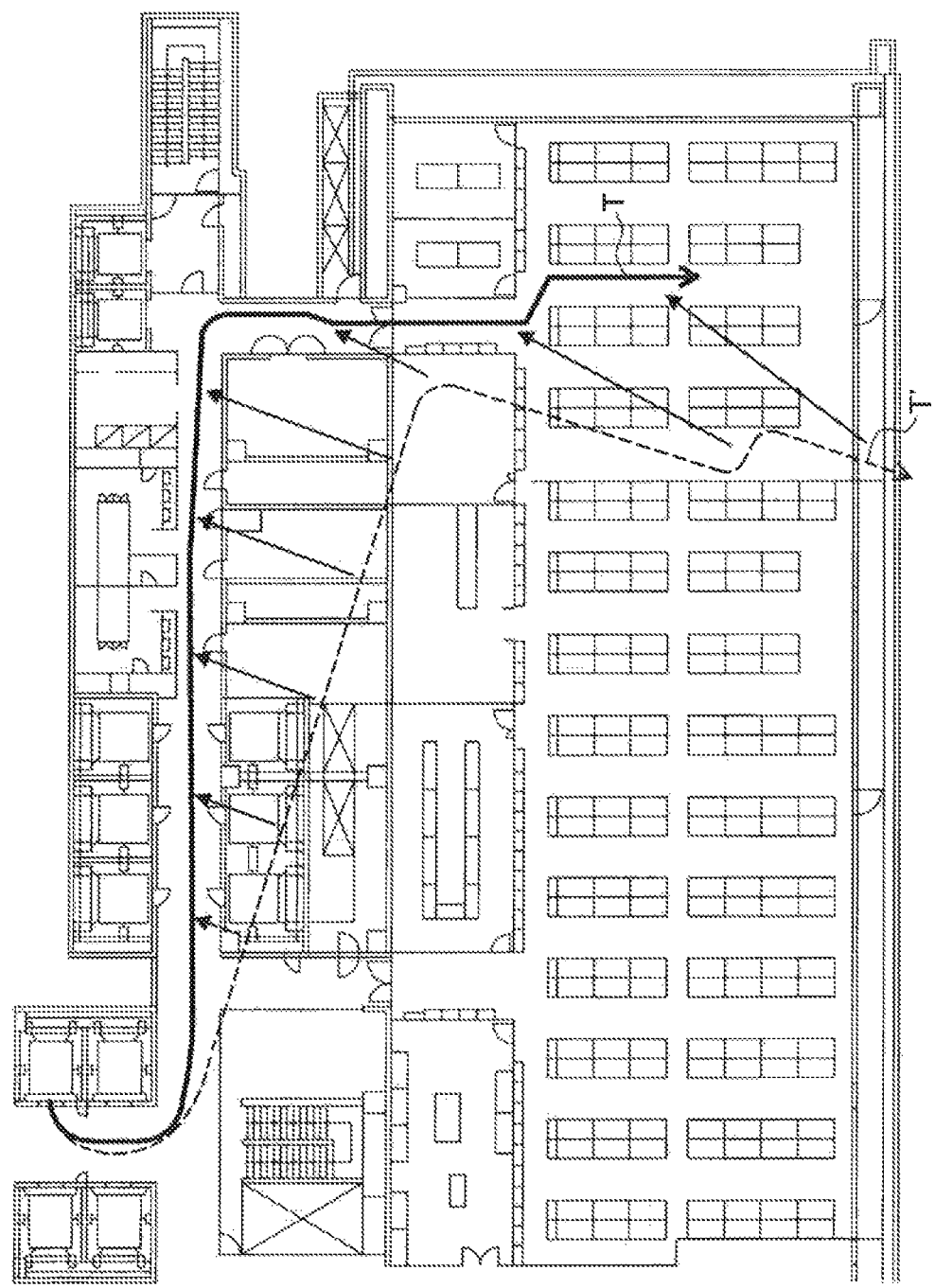

[Fig. 9]
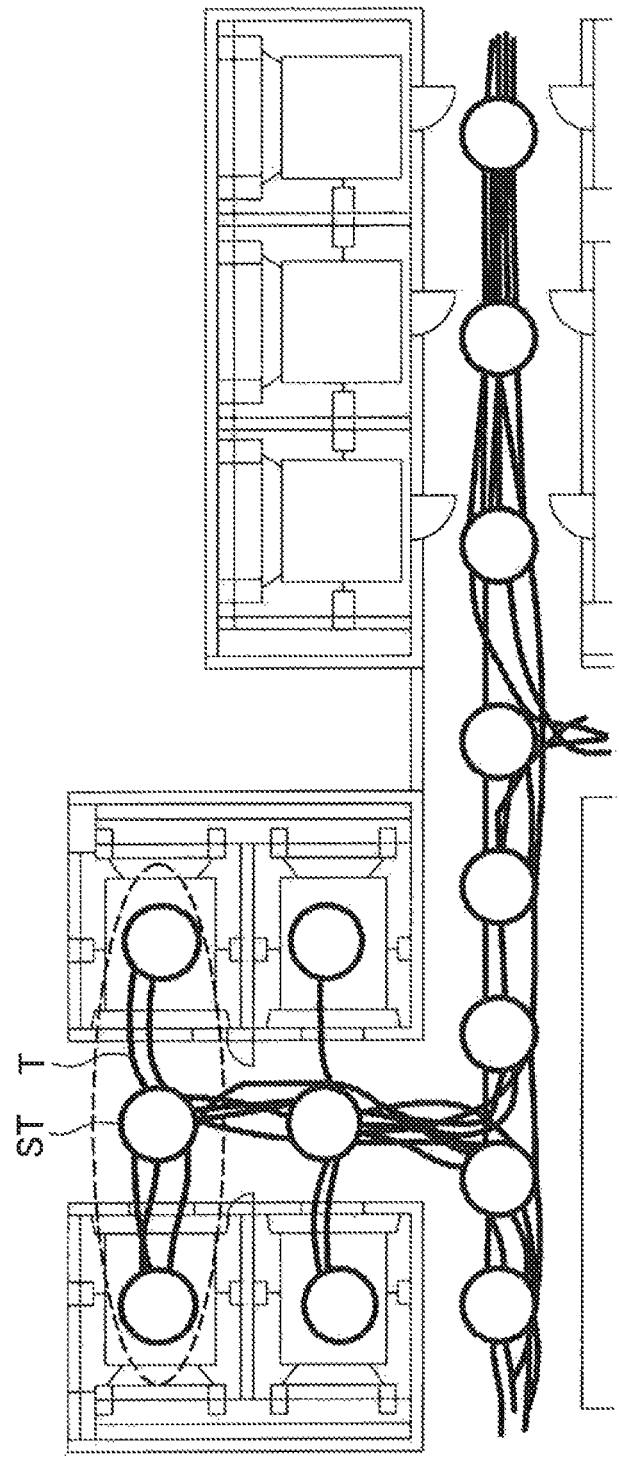

[Fig. 10]
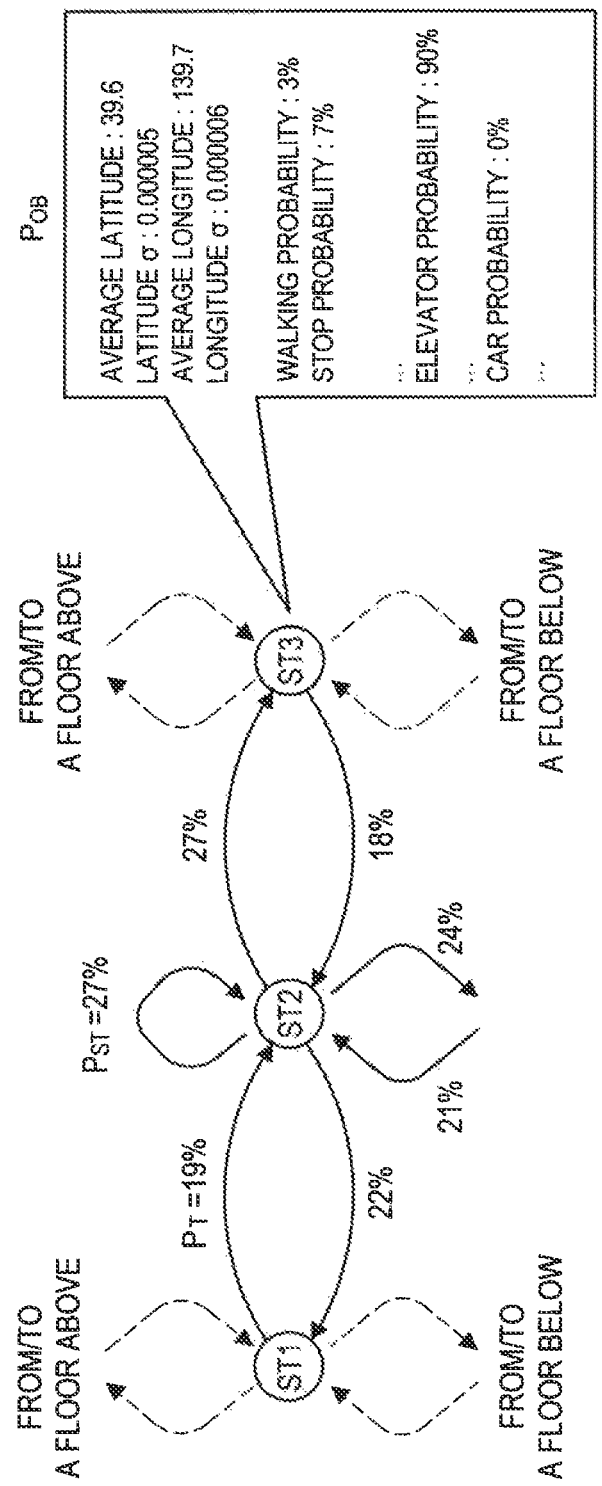

[Fig. 11]
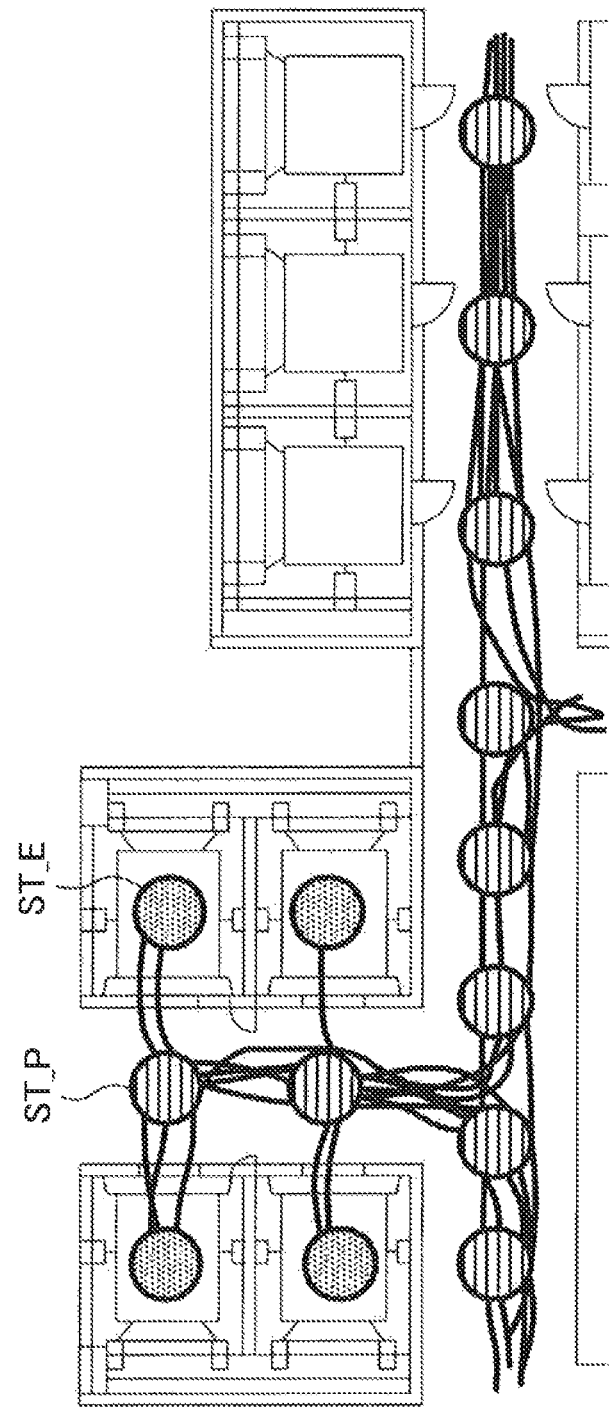

[Fig. 12]
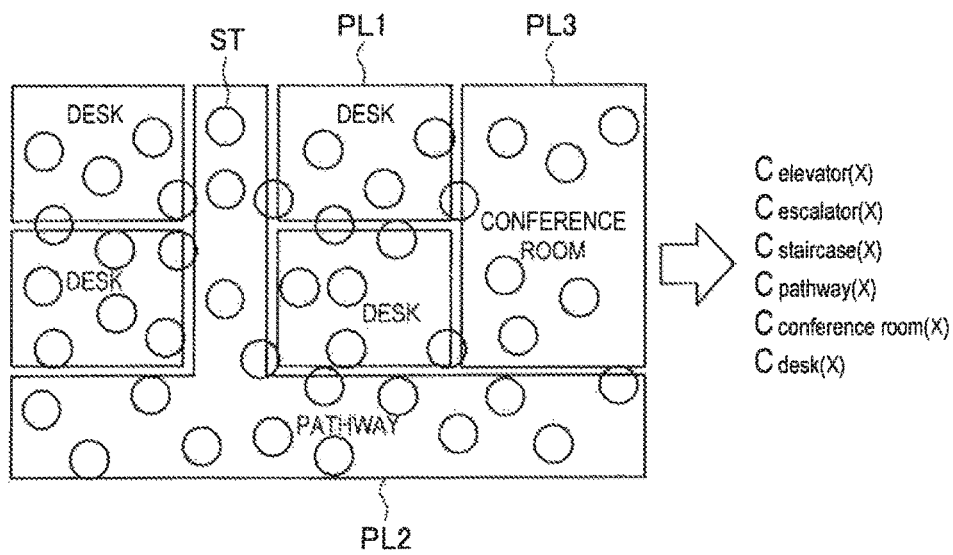

[Fig. 13]
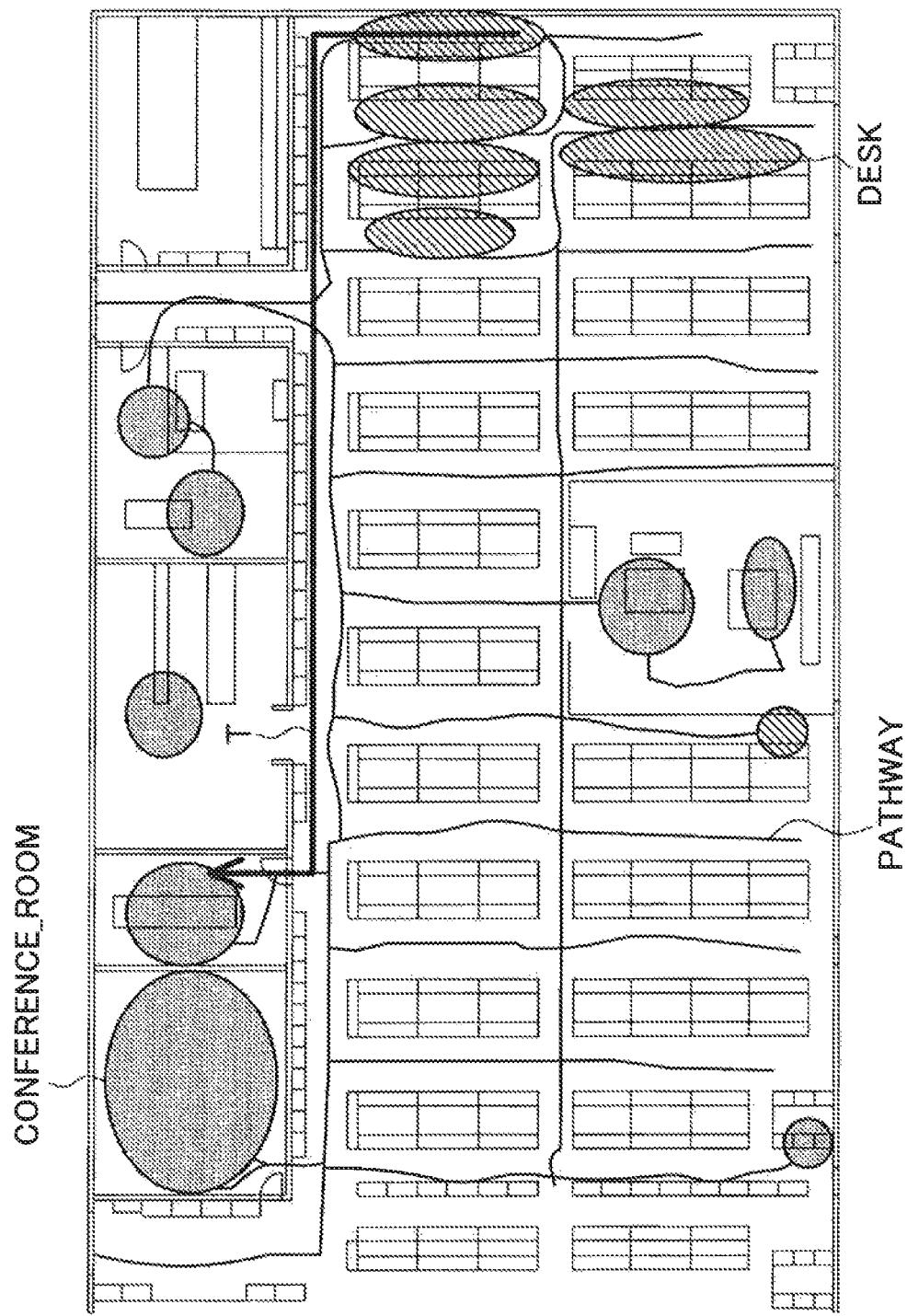

[Fig. 14]
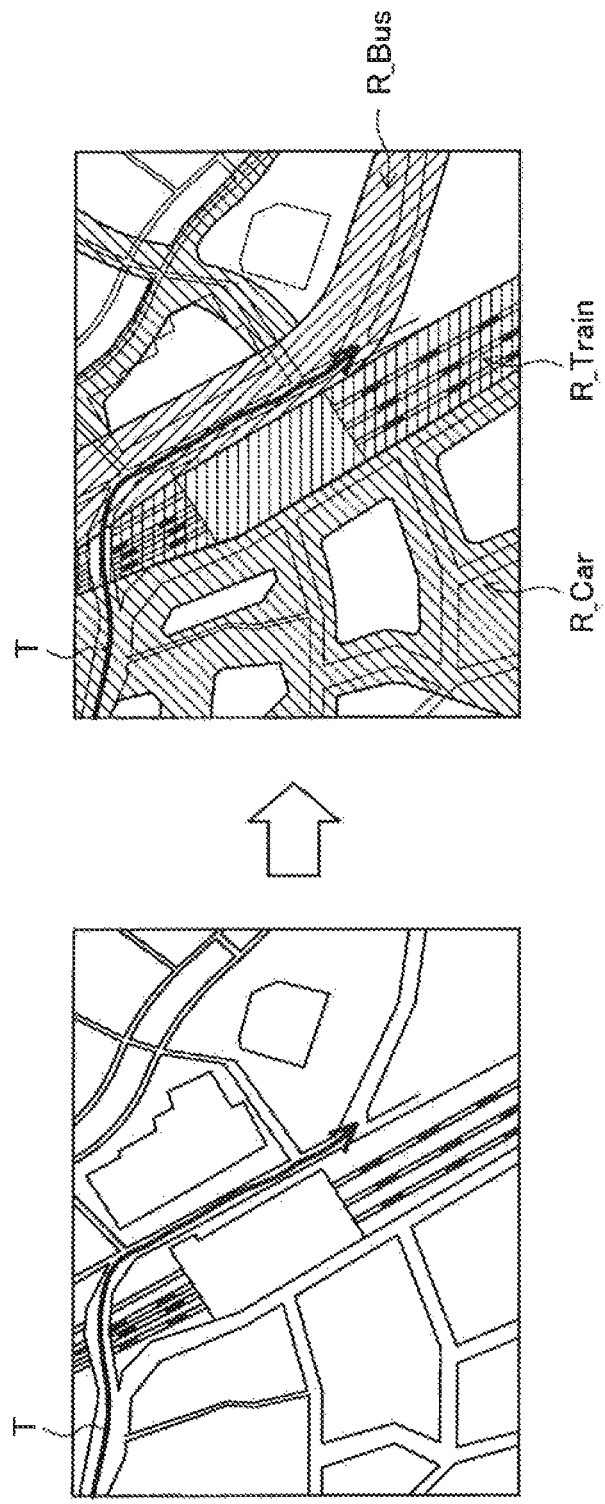

[Fig. 15]
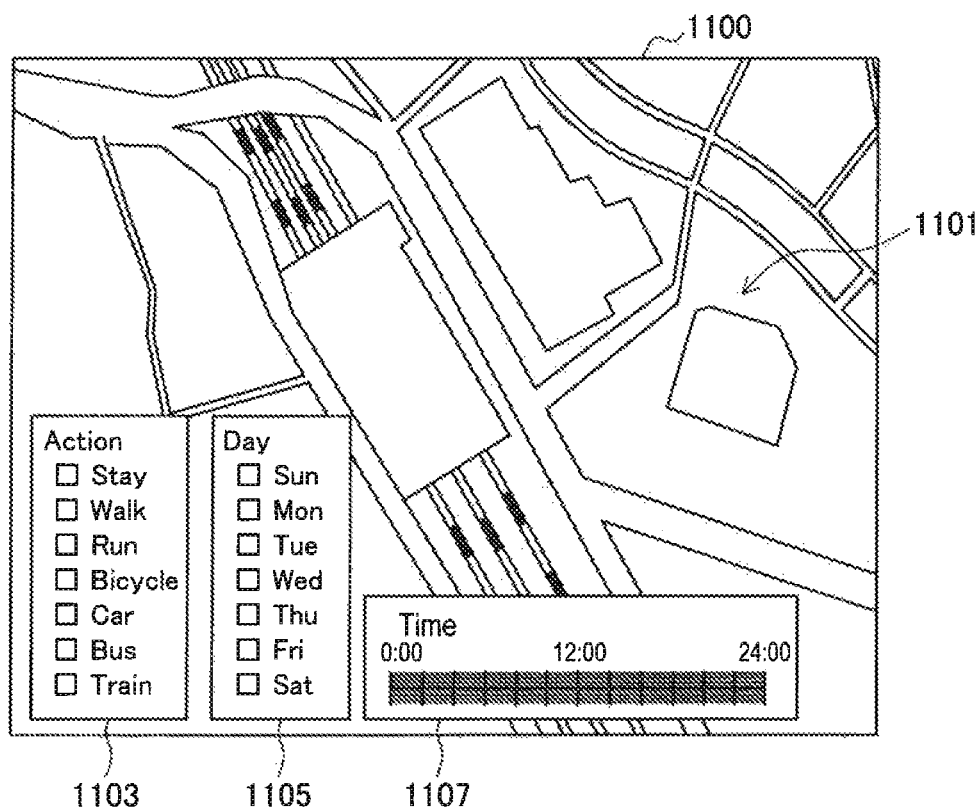

[Fig. 16]
[Fig. 17]
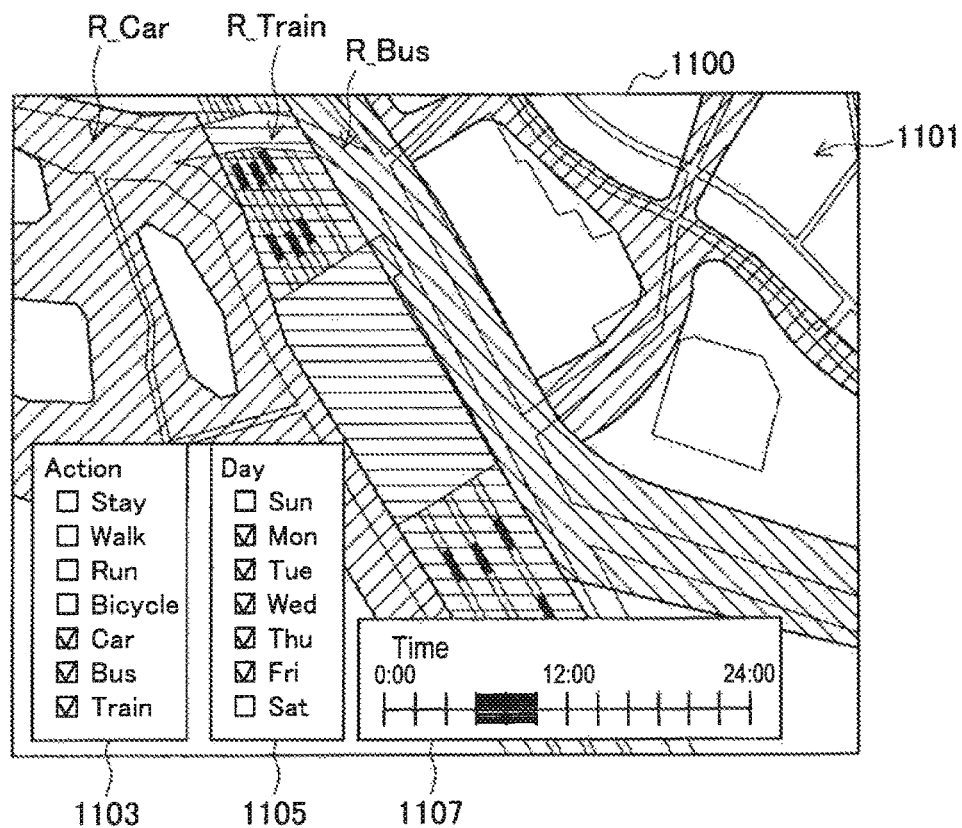

[Fig. 18]
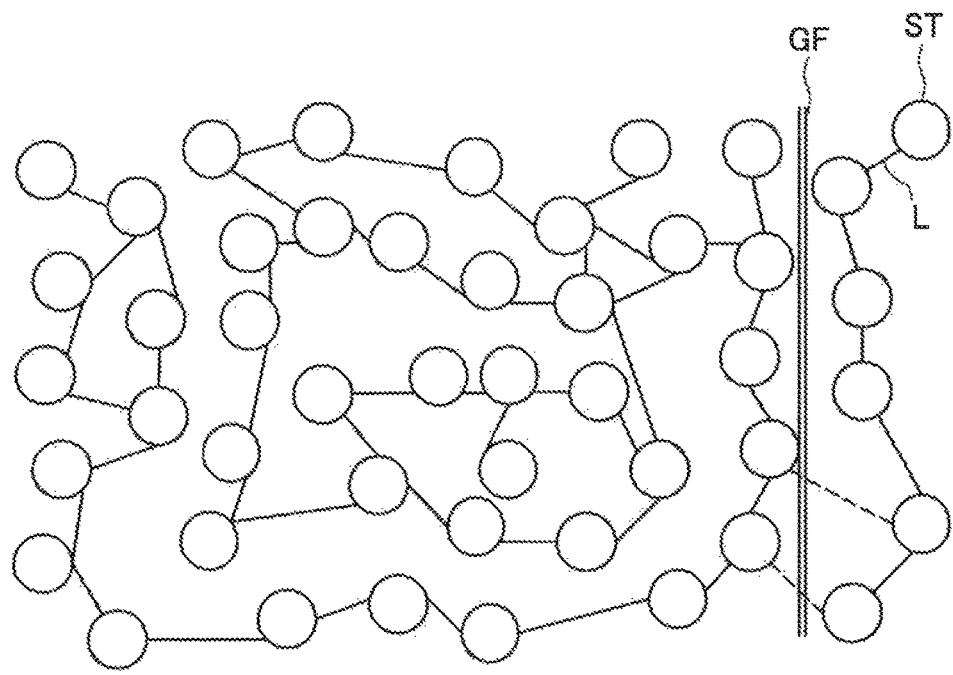

[Fig. 19]
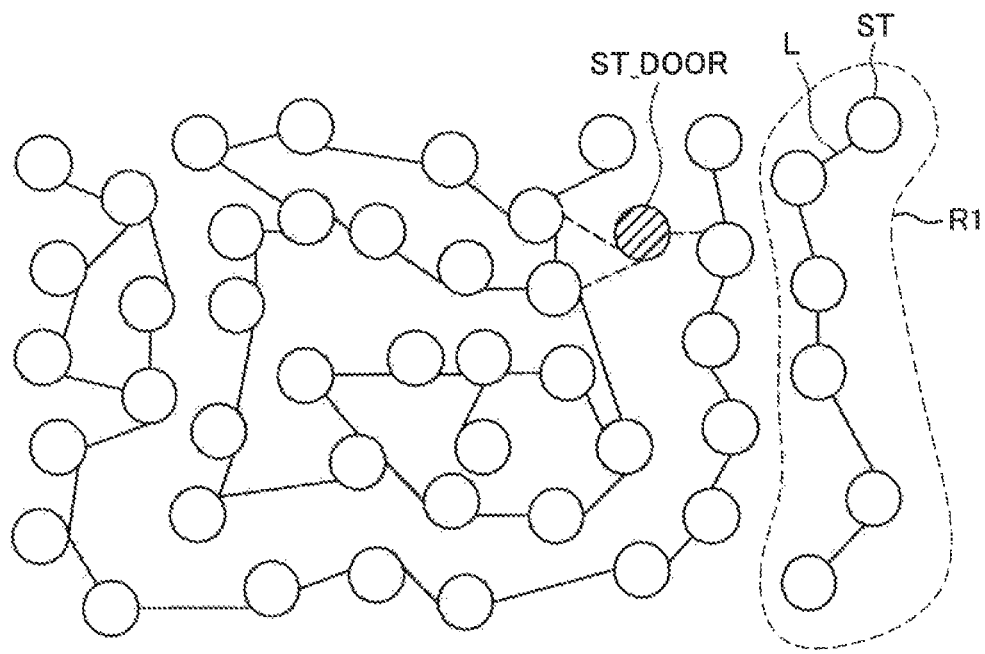

[Fig. 20]
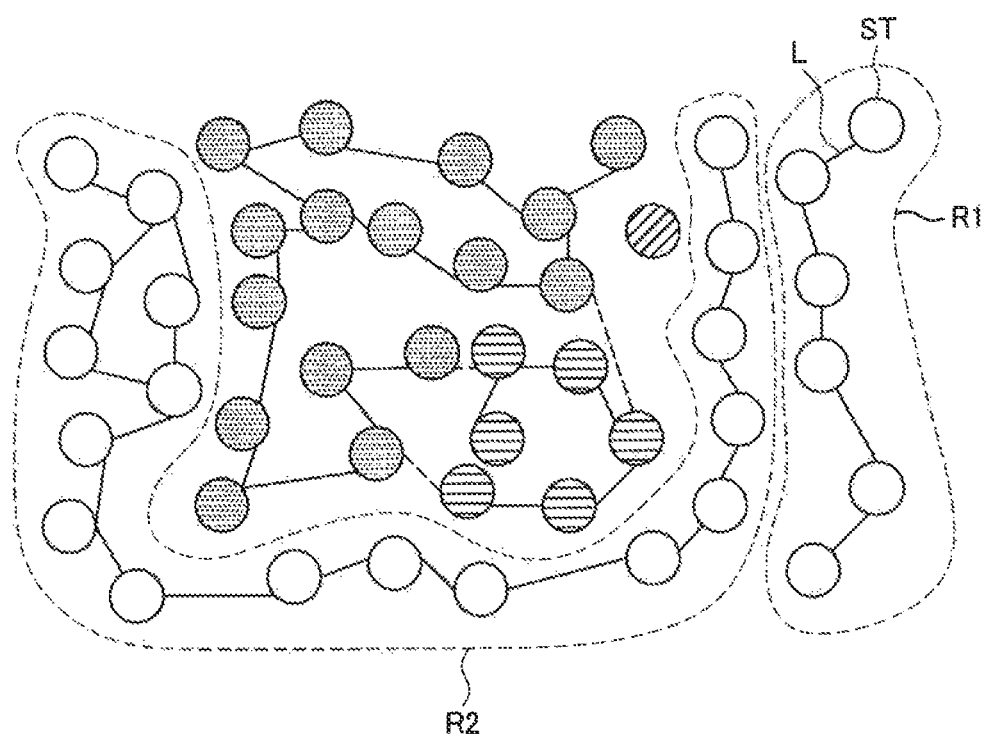

[Fig. 21]
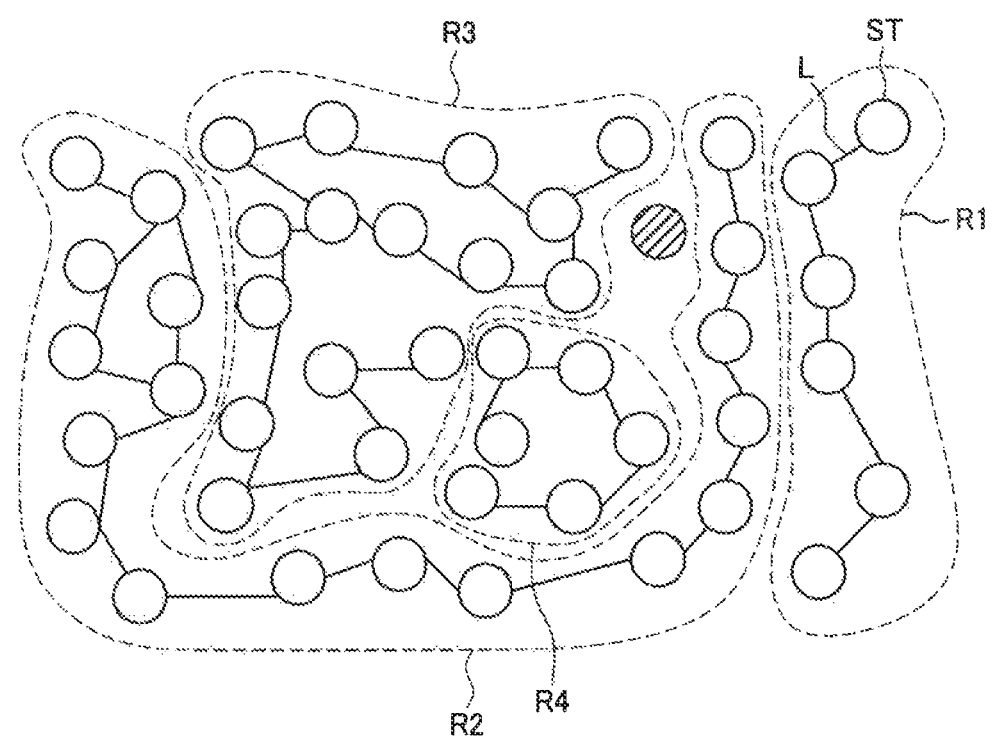

[Fig. 22]
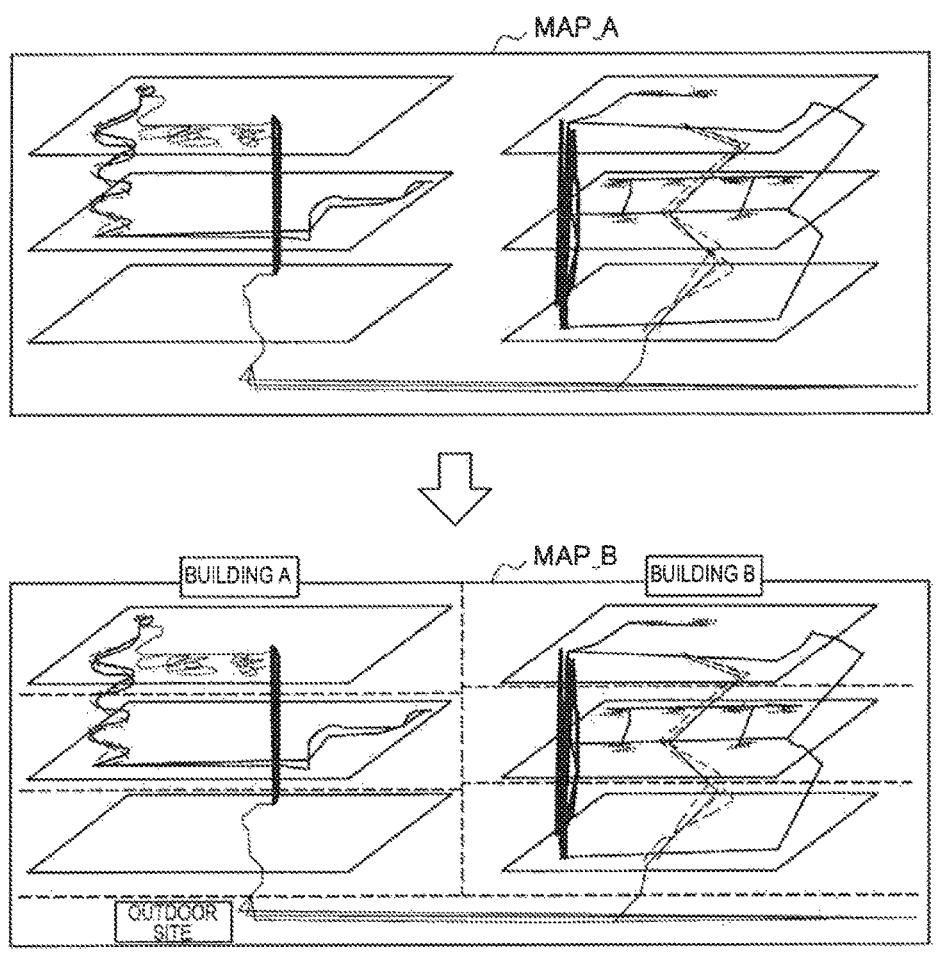

[Fig. 23]
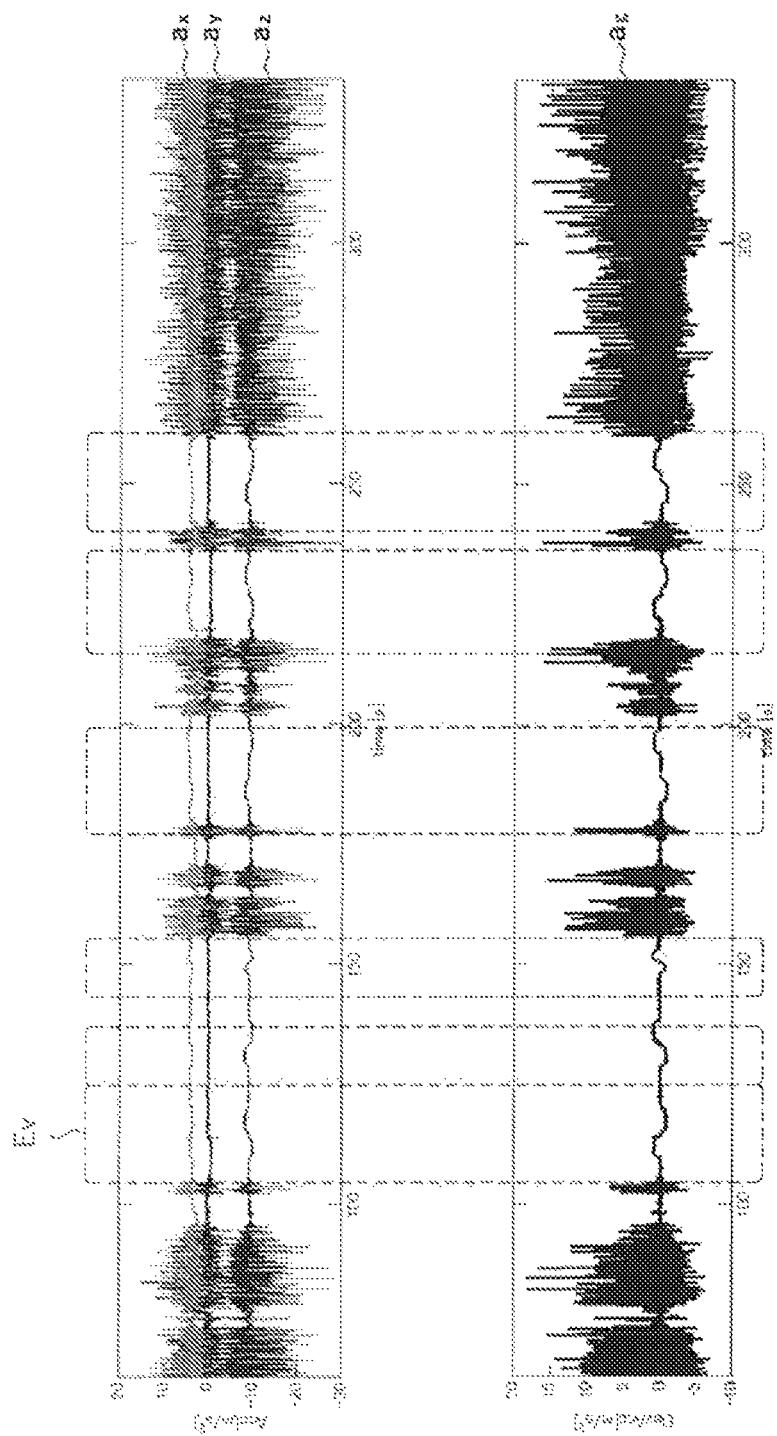

[Fig. 24]
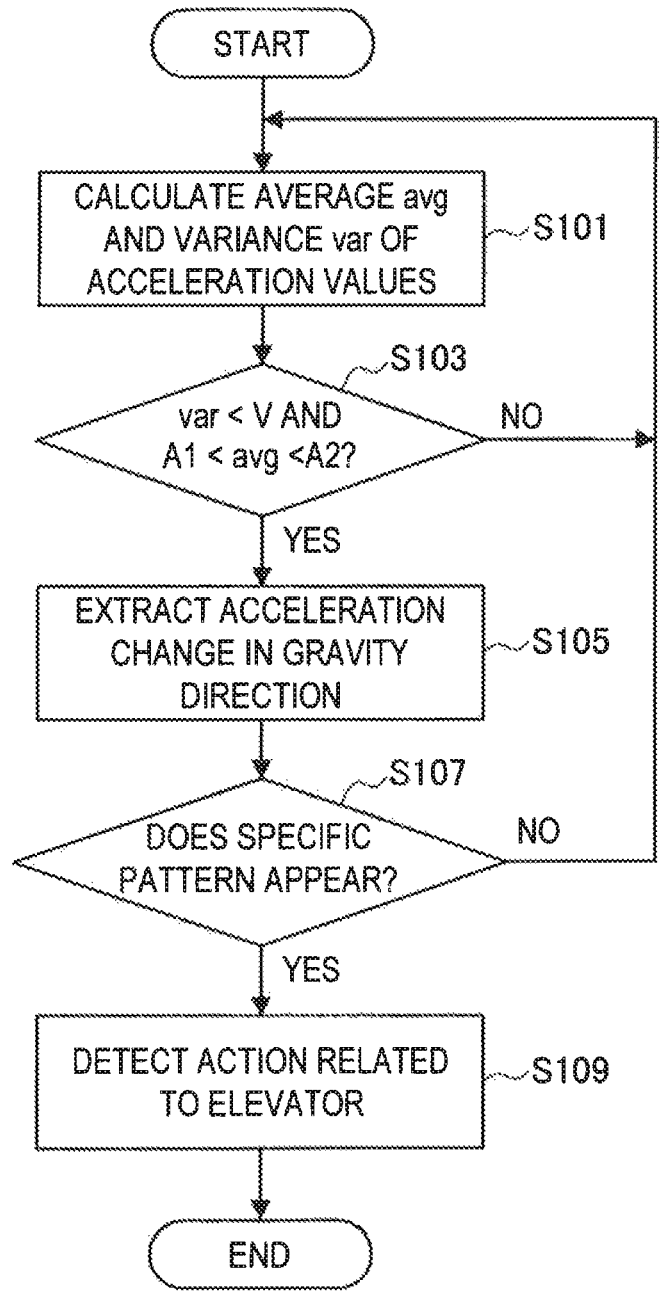

[Fig. 25]
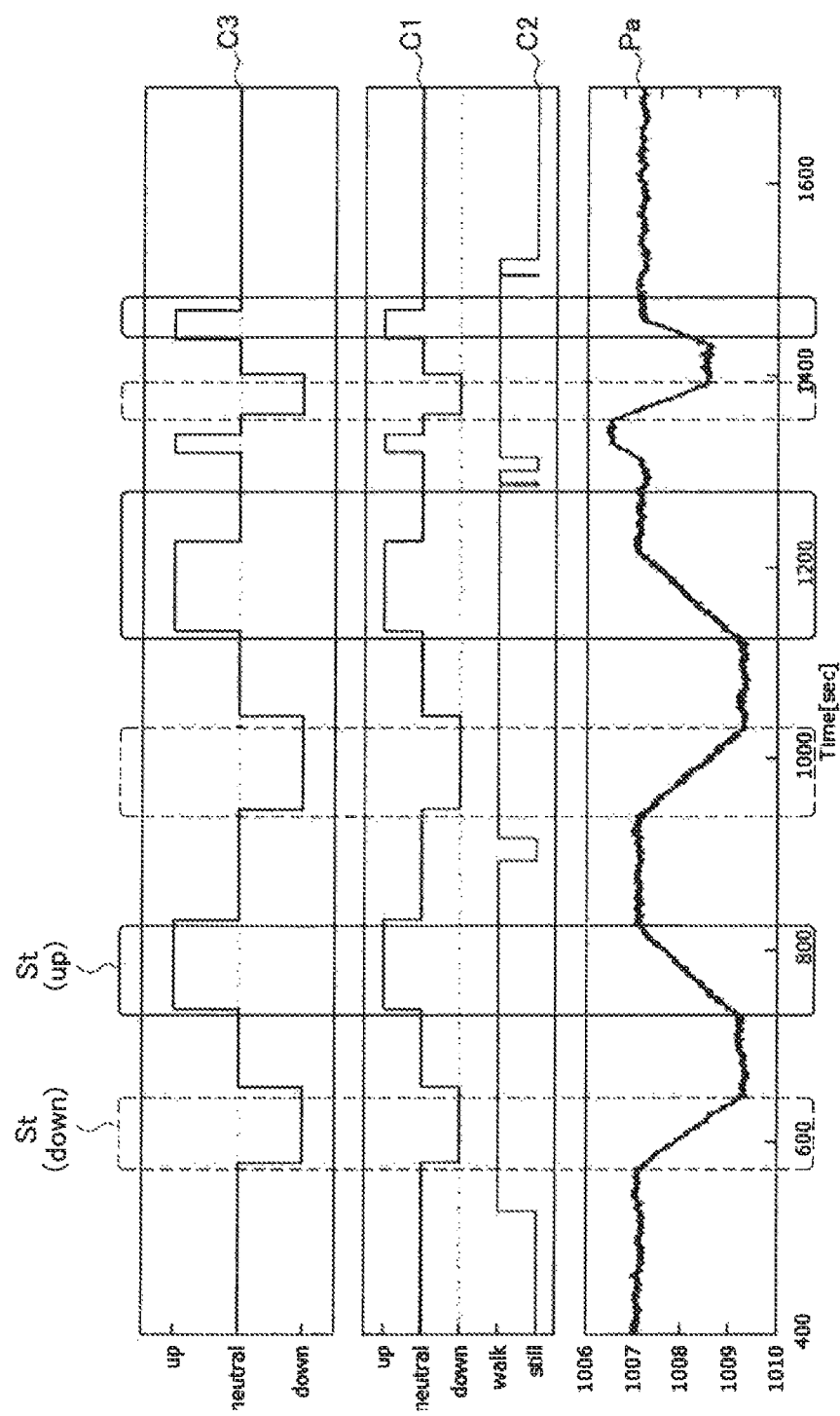

[Fig. 26]
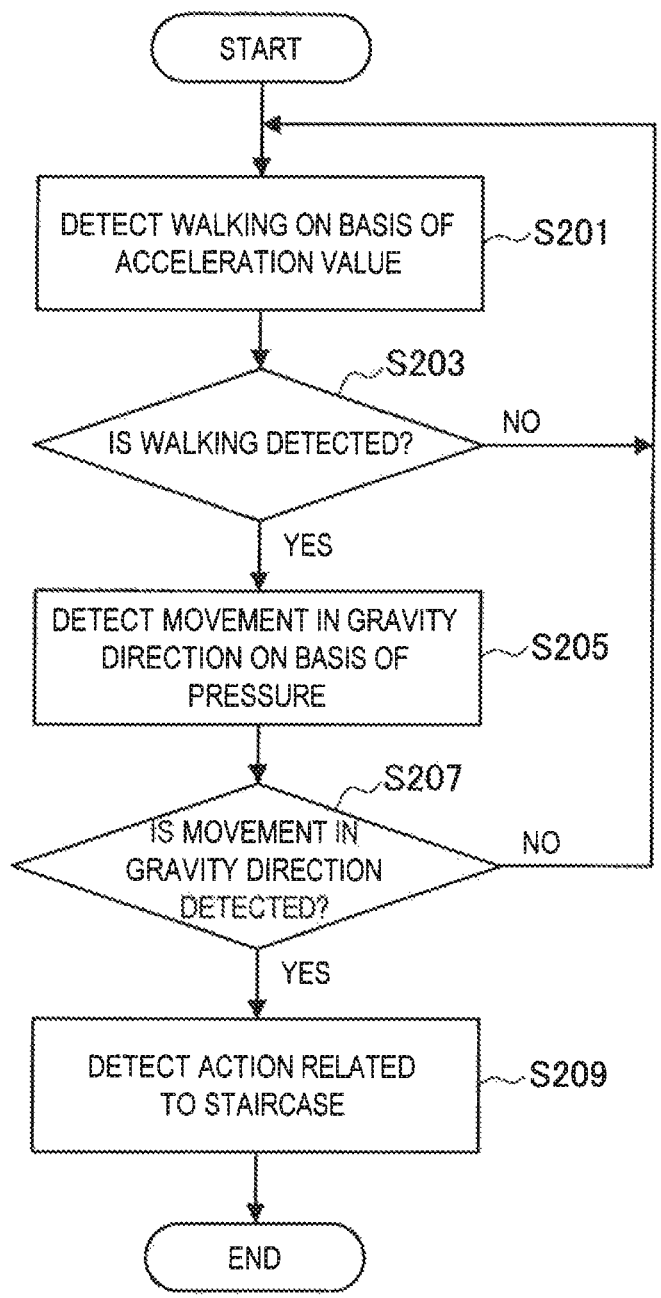

[Fig. 27]
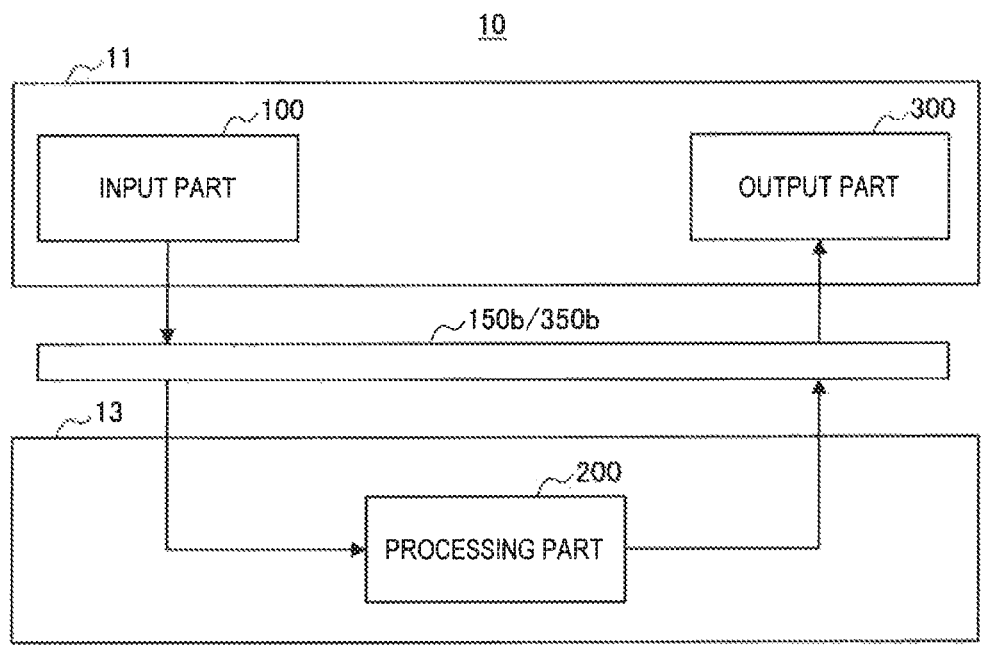
[Fig. 28]
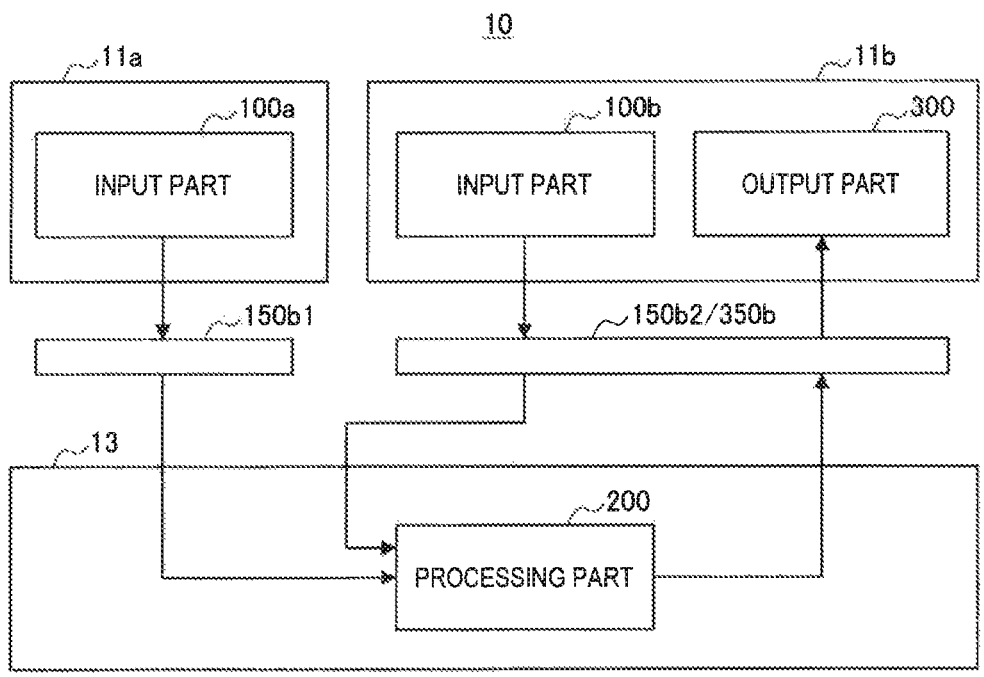

[Fig. 29]
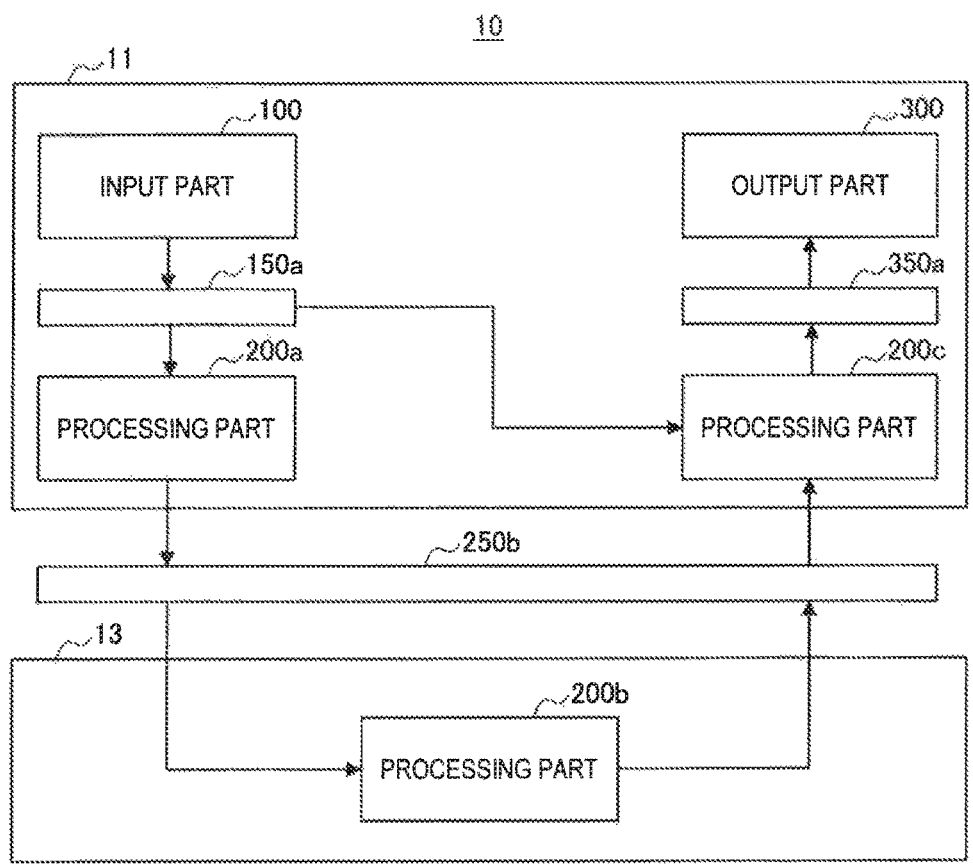

[Fig. 30]
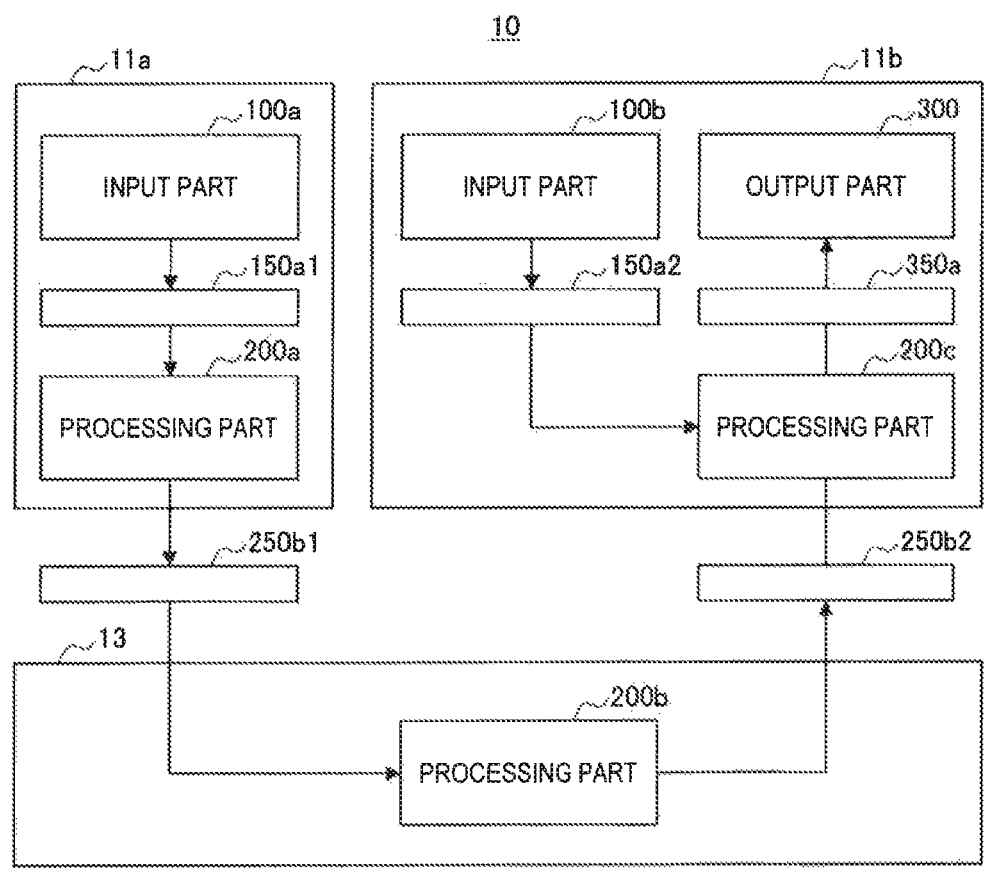

[Fig. 31]
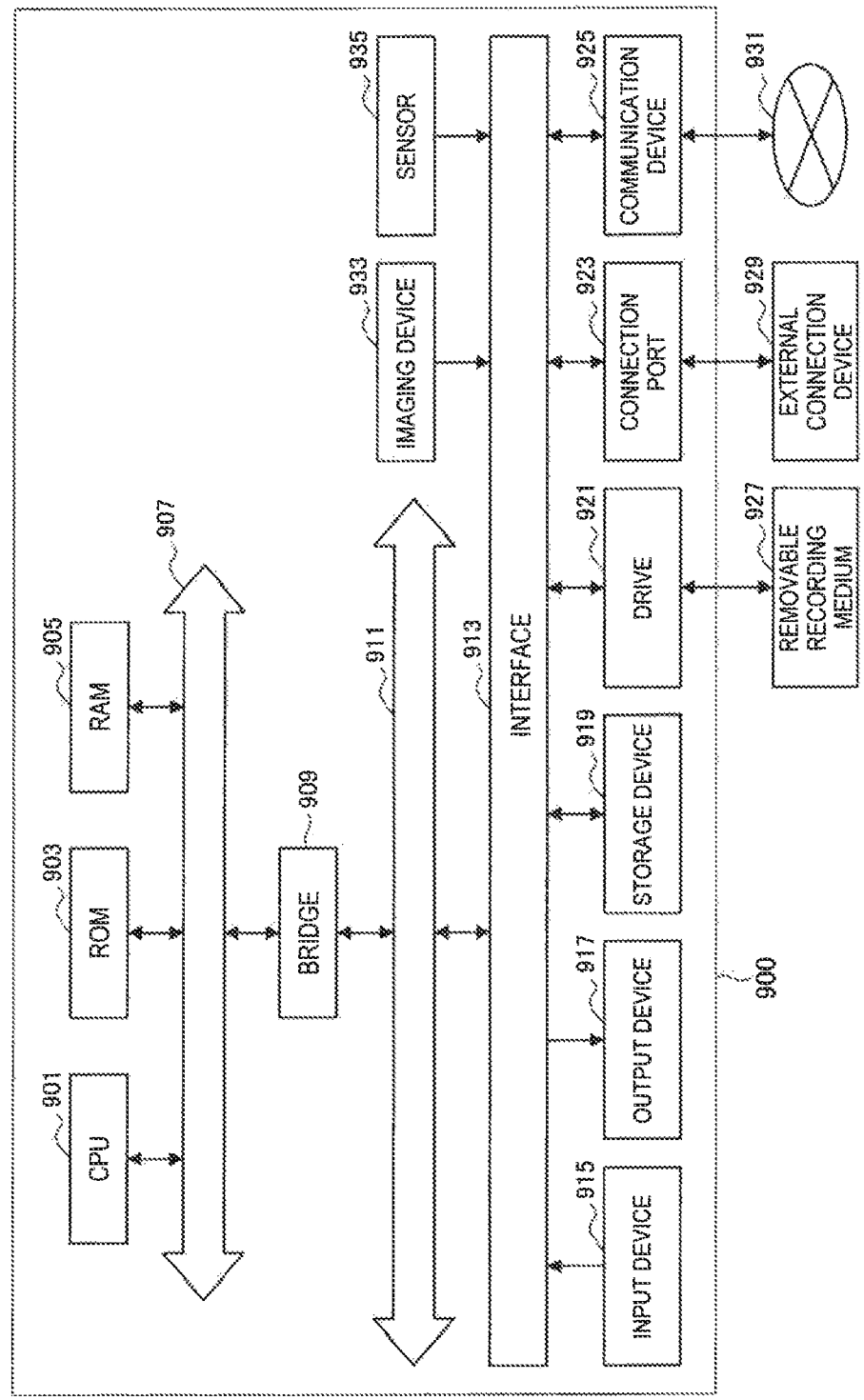

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2015/002693 filed May 27, 2015 under 35 U.S.C. § 371, which claims the benefit of Japanese Priority Patent Application JP 2014-127385 filed Jun. 20, 2014, the entire contents of which are incorporated herein by reference.

TECHNICAL FIELD

The present disclosure relates to an information processing apparatus, an information processing method, and a program.

BACKGROUND ART

There has been developed action recognition technology for recognizing an action of a user using a detection value obtained by an acceleration sensor mounted on a mobile device or a wearable device worn or carried by the user. PTL 1, for example, shows the action recognition technology and an example of information provided to the user using information obtained by the action recognition technology.

CITATION LIST

Patent Literature

[PTL 1]
JP 2013-003643A

SUMMARY

Technical Problem

In the technology described in PTL 1, action recognition is carried out using, together with a detection value obtained by an acceleration sensor or the like, position information of a user acquired by using a global positioning system (GPS). The position information is used for specifying, for example, a location where an action of the user has occurred and a movement speed of the user. The more effective use of the position information acquired in the action recognition technology has not been described in PTL 1 and the like.

Accordingly, the present disclosure suggests an information processing apparatus, an information processing method, and a program which are novel and improved, and which are capable of more effectively using position information and action recognition information included in an action log.

Solution to Problem

According to an aspect of the present disclosure, there is provided an information processing apparatus including a processing circuit configured to obtain activity recognition information which is determined on the basis of sensing information of a plurality of users, the activity recognition information indicating recognized activities of the plurality of users based on location information of the plurality of users, and generate information for displaying representations of the recognized activities of the plurality of users in relation to a map by using specified criteria.

According to another aspect of the present disclosure, there is provided an information processing method including: obtaining activity recognition information which is determined on the basis of sensing information of a plurality of users, the activity recognition information indicating recognized activities of the plurality of users based on location information of the plurality of users; generating information for displaying representations of the recognized activities of the plurality of users; and displaying the representations in relation to a map, based on the generated information and by using specified criteria.

According to another aspect of the present disclosure, there is provided a non-transitory computer-readable medium having embodied thereon a program, which when executed by a computer causes the computer to execute an information processing method, the method including: obtaining activity recognition information which is determined on the basis of sensing information of a plurality of users, the activity recognition information indicating recognized activities of the plurality of users based on location information of the plurality of users; and generating information for displaying representations of the recognized activities of the plurality of users in relation to a map by using specified criteria.

Advantageous Effects of Invention

According to one or more of embodiments of the present disclosure, the position information and the action recognition information included in the action log can be used more effectively.

Note that the effects described above are not necessarily limited, and along with or instead of the effects, any effect that is desired to be introduced in the present specification or other effects that can be expected from the present specification may be exhibited.

BRIEF DESCRIPTION OF DRAWINGS

FIG. 1 is a block diagram showing an example of an overall configuration of an embodiment of the present disclosure.

FIG. 2A is a block diagram showing another example of an overall configuration of an embodiment of the present disclosure.

FIG. 2B is a block diagram showing another example of an overall configuration of an embodiment of the present disclosure.

FIG. 3 is a schematic block diagram showing a first example of functional configurations of an input part, a processing part, and an output part according to an embodiment of the present disclosure.

FIG. 4 is a schematic block diagram showing a second example of functional configurations of an input part, a processing part, and an output part according to an embodiment of the present disclosure.

FIG. 5 is a diagram illustrating a first stage of position information correction according to an embodiment of the present disclosure.

FIG. 6 is a diagram illustrating a second stage of position information correction according to an embodiment of the present disclosure.

FIG. 7 is a diagram illustrating a third stage and a fourth stage of position information correction according to an embodiment of the present disclosure.

FIG. 8 is a diagram illustrating an effect of position information correction according to an embodiment of the present disclosure.

FIG. 9 is a diagram illustrating a model learning function according to an embodiment of the present disclosure.

FIG. 10 is a diagram illustrating a model learning function according to an embodiment of the present disclosure.

FIG. 11 is a diagram illustrating estimation of a location attribute based on a model of a state according to an embodiment of the present disclosure.

FIG. 12 is a diagram illustrating estimation of a location attribute based on a model of a state according to an embodiment of the present disclosure.

FIG. 13 is a diagram illustrating an example of a use of a location attribute according to an embodiment of the present disclosure.

FIG. 14 is a diagram illustrating correction of a result of action recognition using a score of an action according to an embodiment of the present disclosure.

FIG. 15 is a diagram illustrating presentation of information using a score of an action according to an embodiment of the present disclosure.

FIG. 16 is a diagram illustrating presentation of information using a score of an action according to an embodiment of the present disclosure.

FIG. 17 is a diagram illustrating presentation of information using a score of an action according to an embodiment of the present disclosure.

FIG. 18 is a diagram illustrating a first stage of map division according to an embodiment of the present disclosure.

FIG. 19 is a diagram illustrating a second stage of map division according to an embodiment of the present disclosure.

FIG. 20 is a diagram illustrating a third stage of map division according to an embodiment of the present disclosure.

FIG. 21 is a diagram showing a result of map division according to an embodiment of the present disclosure.

FIG. 22 is a diagram illustrating an effect of action map division according to an embodiment of the present disclosure.

FIG. 23 is a diagram illustrating detection of an action related to an elevator according to an embodiment of the present disclosure.

FIG. 24 is a flowchart showing an example of processing of detecting an action related to an elevator according to an embodiment of the present disclosure.

FIG. 25 is a diagram illustrating detection of an action related to a staircase according to an embodiment of the present disclosure.

FIG. 26 is a flowchart showing an example of processing of detecting an action related to a staircase according to an embodiment of the present disclosure.

FIG. 27 is a block diagram showing a first example of a system configuration according to an embodiment of the present disclosure.

FIG. 28 is a block diagram showing a second example of a system configuration according to an embodiment of the present disclosure.

FIG. 29 is a block diagram showing a third example of a system configuration according to an embodiment of the present disclosure.

FIG. 30 is a block diagram showing a fourth example of a system configuration according to an embodiment of the present disclosure.

FIG. 31 is a block diagram showing a hardware configuration example of an information processing apparatus according to an embodiment of the present disclosure.

DESCRIPTION OF EMBODIMENTS

Hereinafter, embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will be given in the following order.

1. Overall configuration
1-1. Input part
1-2. Processing part
1-3. Output part
2. Examples of functional configurations
2-1. First example
2-2. Second example
3. Position information correction function
4. Model learning function
5. Map generation function
6. Processing function of associating position information with building equipment
7. System configuration
8. Hardware configuration
9. Supplement

1. OVERALL CONFIGURATION

FIG. 1 is a block diagram showing an example of an overall configuration of an embodiment of the present disclosure. Referring to FIG. 1, a system 10 includes an input part 100, a processing part 200, and an output part 300. The input part 100, the processing part 200, and the output part 300 are achieved by one or a plurality of information processing apparatuses as shown in a configuration example of the system 10 to be described later.

1-1. Input Part

The input part 100 includes, for example, an operation input device, a sensor, or software for acquiring information from an external service, and accepts inputs of various pieces of information from a user, an ambient environment, or other services.

The operation input device includes, for example, a hardware button, a keyboard, a mouse, a touch panel, a touch sensor, a proximity sensor, an acceleration sensor, a gyro sensor, and a temperature sensor, and accepts an operation input performed by a user. Further, the operation input device may include a camera (image sensor), a microphone, or the like which accepts an operation input expressed by a gesture or a voice of a user.

Note that the input part 100 may include a processor or a processing circuit which converts a signal or data acquired by the operation input device into an operation command. Alternatively, the input part 100 may output, to an interface 150, a signal or data acquired by the operation input device without converting the signal or data into an operation command. In that case, the signal or data acquired by the operation input device is converted into the operation command in the processing part 200, for example.

The sensor includes an acceleration sensor, a gyro sensor, a geomagnetic sensor, a light intensity sensor, a temperature sensor, a pressure sensor, or the like, and detects acceleration and angular velocity of the device, azimuth, illuminance, temperature, pressure, or the like. Regarding each of the sensors, in the case where a device including a sensor is carried or worn by a user, the sensor can detect each piece of information as information related to the user, for example, as information indicating a movement or an orientation of the user. Further, the sensor may additionally include a sensor which detects biological information of the user such as the pulse, the perspiration, the brainwave, the sense of touch, the sense of smell, and the sense of taste. The input part 100 may include a processing circuit which acquires information indicating an emotion of the user by analyzing information detected by those sensors and/or data of an image or audio detected by a camera or a microphone to be described later. Alternatively, the information and/or the data may be output to the interface 150 without being analyzed, and the analysis may be executed in the processing part 200, for example.

In addition, the sensor may acquire an image or audio near the user or the device as the data with a camera, a microphone, the above-mentioned sensors, or the like. Further, the sensor may include position detection means which detects a position in an indoor site or an outdoor site. To be specific, the position detection means may include a global navigation satellite system (GNSS) receiver, and/or a communication device. The GNSS may include, for example, a global positioning system (GPS), a global navigation satellite system (GLONASS), a BeiDou navigation satellite system (BDS), a quasi-zenith satellite system (QZSS), a Galileo, or the like. In the following description, the GPS is used as an example, but other GNSS's may also be used. The communication device detects a position using technology of Wi-fi, multi-input multi-output (MIMO), cellular communication (for example, position detection using a mobile base station, femtocell), near field communication (for example, Bluetooth Low Energy (BLE), Bluetooth (registered trademark)), or the like.

In the case where one of the above-mentioned sensors detects the position or the situation (including biological information) of the user, the device including the sensor is carried or worn by the user, for example. Alternatively, also in the case where the device including the sensor is installed in the living environment of the user, the device may also be capable of detecting the position or the situation (including biological information) of the user. For example, the pulse of the user can be detected by analyzing an image including the face of the user acquired by a camera fixed and installed in a room.

Note that the input part 100 may include a processor or a processing circuit which converts a signal or data acquired by a sensor into a given format (for example, converts an analog signal into a digital signal, or encodes image data or audio data). Alternatively, the input part 100 may output, to the interface 150, the acquired signal or data without converting the signal or data into the given format. In that case, the signal or data acquired by the sensor is converted into the operation command in the processing part 200, for example.

The software for acquiring information from an external service acquires various pieces of information provided by the external service using an application program interface (API) of the external service, for example. The software may acquire information from a server of the external service, or may acquire information from application software of a service executed on a client device. With the software, information such as a text, an image, and the like which the user or other users has posted on an external service such as social media, for example, may be acquired. The information that may be acquired may not necessarily be information that has been posted intentionally by the user or other users, and may be a log of operation executed by the user or other users, for example. Further, the information to be acquired is not limited to personal information of the user or other users, and may be information distributed to an unspecified number of users, such as news, a weather forecast, traffic information, a point of interest (POI), or an advertisement.

Further, the information acquired from an external service may include information generated by the following procedure: the information acquired by the above-mentioned sensors, such as acceleration, angular velocity, azimuth, illuminance, temperature, pressure, a pulse, perspiration, a brainwave, a sense of touch, a sense of smell, a sense of taste, other biological information, an emotion, and position information, is detected by a sensor included in another system cooperating with the external service; and the information acquired by the above-mentioned sensors are posted on the external service.

The interface 150 is an interface between the input part 100 and the processing part 200. For example, in the case where the input part 100 and the processing part 200 are achieved by separate devices, the interface 150 may include a wired or wireless communication interface. Further, the Internet may be interposed between the input part 100 and the processing part 200. To be more specific, the wired or wireless communication interface may include cellular communication such as 3G/LTE, Wi-Fi, Bluetooth (registered trademark), near field communication (NFC), Ethernet (registered trademark), a high-definition multimedia interface (HDMI) (registered trademark), and a universal serial bus (USB). Further, in the case where the input part 100 and at least a part of the processing part 200 are achieved by a single device, the interface 150 may include a bus inside the device and data reference within a program module (hereinafter, those are referred to as interface inside a device). Further, in the case where the input part 100 is achieved by a plurality of devices dispersedly, the interface 150 may include various kinds of interfaces for the respective devices. For example, the interface 150 may include both the communication interface and the interface inside the device.

1-2. Processing Part

The processing part 200 executes various processes on the basis of information acquired by the input part 100. To be more specific, the processing part 200 includes, for example, a processor or a processing circuit such as a central processing unit (CPU), a digital signal processor (DSP), an application specific integrated circuit (ASIC), or a field-programmable gate array (FPGA). Further, the processing part 200 may include memory or a storage device for temporarily or permanently storing a program executed in the processor or the processing circuit and data read and written in the processing.

Note that the processing part 200 may be achieved by a single processor or a single processing circuit inside a single device, or may be achieved dispersedly by a plurality of processors or a plurality of processing circuits inside a plurality of devices or a single device. In the case where the processing part 200 is achieved dispersedly, as shown in the examples shown in FIG. 2A and FIG. 2B, an interface 250 is interposed between the divided parts of the processing part 200. The interface 250 may include, in the same manner as the interface 150, the communication interface or the interface inside the device. Note that, in a detailed description of the processing part 200 below, individual functional blocks constituting the processing part 200 are shown as an example, and the interface 250 may be interposed between any functional blocks. That is, in the case where the processing part 200 is achieved by a plurality of devices, or is achieved dispersedly by a plurality of processors or a plurality of processing circuits, the functional blocks may be allocated to any devices, processors, or processing circuits, unless otherwise mentioned.

1-3. Output Part

The output part 300 outputs information provided by the processing part 200 to a user (who may be the same user as or may be a different user from the user of the input part 100), an external device, or another service. For example, the output part 300 may include an output device, a control device, or software for providing information to an external service.

The output device outputs the information provided by the processing part 200 in a format that is perceived by senses of a user (who may be the same user as or may be a different user from the user of the input part 100), such as the senses of sight, hearing, touch, smell, and taste. For example, the output device is a display, and outputs the information in an image. Note that the display is not limited to reflection-type or self-emitting display such as a liquid crystal display (LCD) or an organic electro-luminescence (EL) display, and includes a combination of a light-guiding member that leads image display light to the eyes of the user and a light source, which is used for a wearable device. Further, the output device may include a speaker and may output information by audio. In addition, the output device may also include a projector, a vibrator, or the like.

The control device controls a device on the basis of the information provided by the processing part 200. The device to be controlled may be included in the devices for achieving the output part 300, or may be an external device. To be more specific, the control device includes a processor or a processing circuit which generates a control command, for example. In the case where the external device is controlled, the output part 300 may further include a communication device which transmits the control command to the external device. The control device controls a printer which outputs the information provided by the processing part 200 as a printed matter, for example. The control device may also include a driver for controlling writing of the information provided by the processing part 200 in a storage device or a removable recording medium. Alternatively, the control device may also control a device other than a device which outputs or records the information provided by the processing part 200. For example, the control device may control a lighting device to turn on the light, may control a TV to turn off the image, may control an audio device to adjust the volume, and may control a robot to control the motion and the like.

The software for providing information to an external service provides the information provided by the processing part 200 to the external service using the API of the external service, for example. The software may provide a server of the external service with the information, or may provide application software of a service executed on a client device with the information. The information to be provided may not necessarily be immediately reflected on the external service, and may be provided as a candidate used by a user to be posted on or transmitted to the external service. To be more specific, for example, the software may provide a text used as a candidate for a search keyword or a uniform resource locator (URL) to be input by the user in browser software executed on a client device. Further, for example, the software instead of the user may also post a text, an image, a video, an audio, and the like on an external service such as social media.

An interface 350 is an interface between the processing part 200 and the output part 300. For example, in the case where the processing part 200 and the output part 300 are achieved by separate devices, the interface 350 may include a wired or wireless communication interface. Further, in the case where at least a part of the processing part 200 and the output part 300 are achieved by a single device, the interface 350 may include the interface inside a device. Further, in the case where the output part 300 is achieved by a plurality of devices dispersedly, the interface 350 may include various kinds of interfaces for the respective devices. For example, the interface 350 may include both the communication interface and the interface inside the device.

2. EXAMPLES OF FUNCTIONAL CONFIGURATIONS 2-1. First Example

FIG. 3 is a schematic block diagram showing a first example of functional configurations of an input part, a processing part, and an output part according to an embodiment of the present disclosure. Hereinafter, with reference to FIG. 3, a first functional configuration example of the input part 100, the processing part 200, and the output part 300 included in the system 10 according to an embodiment will be described.

The input part 100 may include an acceleration sensor 101, a gyro sensor 103, a geomagnetic sensor 105, a pressure sensor 107, and an operation input device 109. The acceleration sensor 101, the gyro sensor 103, the geomagnetic sensor 105, and the pressure sensor 107 are mounted on a terminal device carried or worn by a user, for example. Those sensors can detect acceleration or angular velocity of the user, change in an orientation of the user, and a pressure around the user. The input part 100 may include another sensor which provides sensor data that can be used for autonomous positioning or action recognition to be described later. The operation input device 109 is mounted on the same terminal device as the device on which the above-described sensors are mounted, or may be mounted on a different terminal device. The operation input device 109 acquires an operation input indicating a user's instruction related to information generation based on position information and action recognition information to be described later, for example. As described above, the input part 100 may further include a processor or a processing circuit which converts or analyzes data acquired by those sensors and the operation input device.

The processing part 200 may include an autonomous positioning part 201, an action recognition part 203, an integration analysis part 205, and an information generation part 207. The functional configuration is achieved by a processor or a processing circuit of a server communicating with a terminal device, for example. Further, a part of the functional configuration may be achieved by a processor or a processing circuit of the same terminal device as the sensors or the operation input device included in the input part 100. Note that the specific example of such a configuration will be described later. Hereinafter, each of the components of the functional configuration will be further described.

The autonomous positioning part 201 acquires relative position information by performing autonomous positioning based on detection values obtained by the acceleration sensor 101, the gyro sensor 103, and the geomagnetic sensor 105 (hereinafter, those sensors may be collectively referred to as motion sensors), and the pressure sensor 107. The position information may be the position information of the user who carries or wears a terminal on which the sensor is mounted. In the case where the detection values of the sensor are provided successively in terms of time, the autonomous positioning part 201 acquires a group of position information. Note that, since the technique of the autonomous positioning is already well-known, the detailed description will be omitted. In an embodiment, the autonomous positioning part 201 is capable of employing any configuration of known autonomous positioning technology. The position information acquired by the autonomous positioning part 201 may include information of reliability corresponding to an error range of a detection value obtained by the sensor, for example.

The action recognition part 203 acquires action recognition information by executing action recognition on the basis of detection values obtained by the acceleration sensor 101, the gyro sensor 103, and the geomagnetic sensor 105 (motion sensors), and the pressure sensor 107. With the action recognition, a kind of an action of the user is recognized, the kind being stay, walking, running, jump, staircase, elevator, escalator, bicycle, bus, train, car, ship, or airplane. Note that, since the technique of the action recognition is described in many documents such as JP 2012-8771A and the like, the detailed description will be omitted. In an embodiment, the action recognition part 203 is capable of employing any configuration of known action recognition technology. The action recognition information may include information of reliability corresponding to an error range of a detection value obtained by the sensor or a score calculated for a kind of an action, for example.

In an embodiment, the autonomous positioning part 201 and the action recognition part 203 each analyze detection values obtained by the sensors including the motion sensor, and thereby acquire position information and action recognition information. The position information and the action recognition information are associated with each other on the basis of a time stamp of a detection value of an original sensor, for example. Hereinafter, information including the position information and the action recognition information of a user associated with each other is referred to as action log of the user. In the first example shown in FIG. 3, an action log acquisition function is achieved by the autonomous positioning part 201 and the action recognition part 203. In the case where, in another example, at least one of the autonomous positioning part 201 and the action recognition part 203 is achieved by a device different from a device that achieves the integration analysis part 205, the device that achieves the integration analysis part 205 may achieve the action log acquisition function using a communication device which receives at least one of the position information and the action recognition information.

The integration analysis part 205 analyzes the position information and the action recognition information included in the action log in an integrated manner. To be more specific, for example, the integration analysis part 205 achieves at least one of: a position information correction function involving specifying a reference position included in the group of position information on the basis of the action recognition information, and correcting the group of position information included in a plurality of action logs using the reference position as a reference; and a model learning function involving learning a model of an action of the user at a position indicated by the position information on the basis of the position information and the action recognition information. Further, the integration analysis part 205 may also achieve a map generation function involving generating a map for placing information based on the action recognition information on the basis of the position information and the action recognition information. Note that the detail of those functions will be described later.

The information generation part 207 generates information to be output to the user from the output part 300 on the basis of the information provided by the integration analysis part 205. To be more specific, for example, the information generation part 207 generates information based on a model learned by the model learning function achieved by the integration analysis part 205. Further, the information generation part 207 may also generate information obtained by placing information based on the action recognition information on a map generated on the basis of the position information. The information generated by the information generation part 207 may be output to the output part 300 through the interface 350. Note that a more specific example of the information generated by the information generation part 207 will be described later.

The output part 300 may include a display 301, a speaker 303, and a vibrator 305. The display 301, the speaker 303, and the vibrator 305 are mounted on a terminal device carried or worn by a user, for example. The display 301 outputs information as an image, the speaker 303 outputs information as audio, and the vibrator 305 outputs information as vibration. The information to be output may include the information generated by the information generation part 207. The display 301, the speaker 303, or the vibrator 305 may be mounted on the same terminal device as the device on which the sensors of the input part 100 are mounted. Further, the display 301, the speaker 303, or the vibrator 305 may be mounted on the same terminal device as the operation input device 109 of the input part 100. Alternatively, the display 301, the speaker 303, or the vibrator 305 may be mounted on a different terminal device from the structural elements of the input part 100. Note that more specific configuration examples of the terminal devices for achieving the input part 100, the processing part 200, and the output part 300, and a server will be described later.

2-2. Second Example

FIG. 4 is a schematic block diagram showing a second example of functional configurations of an input part, a processing part, and an output part according to an embodiment of the present disclosure. Hereinafter, with reference to FIG. 4, a second functional configuration example of the input part 100, the processing part 200, and the output part 300 included in the system 10 according to an embodiment will be described. Note that, since the configuration of the output part 300 is the same as the first example, the repeated description will be omitted.

The input part 100 may include a GPS receiver 111, an acceleration sensor 101, a gyro sensor 103, a geomagnetic sensor 105, a pressure sensor 107, and an operation input device 109. The second example is different from the first example in that the input part 100 may include the GPS receiver 111 in addition to the sensors and the operation input device. Accordingly, the input part 100 is capable of executing positioning using a GPS and acquiring absolute position information. The other parts are the same as the first example, and hence, the repeated description will be omitted.

The processing part 200 may include a position information acquisition part 211, an action recognition part 203, an integration analysis part 205, and an information generation part 207. The second example is different from the first example in that the processing part 200 includes the position information acquisition part 211 instead of the autonomous positioning part 201. The position information acquisition part 211 receives position information transmitted from the GPS receiver 111 included in the input part 100 through an interface 150. That is, in the second example shown in FIG. 4, the action log acquisition function is achieved by the position information acquisition part 211 and the action recognition part 203. In the case where the reliability of position information acquired by the GPS that is received by the position information acquisition part 211 is sufficiently high, it is not necessary that the integration analysis part 205 achieve the position information correction function.

Note that the first example and the second example may be employed in a superimposed manner. That is, the input part 100 may include the GPS receiver 111 in addition to the sensors and the operation input device, and the processing part 200 may include both the autonomous positioning part 201 and the position information acquisition part 211. In this case, in the case where the positioning can be performed by the GPS receiver 111, the second example may be employed. That is, the position information acquisition part 211 receives the position information transmitted by the GPS receiver 111, and the integration analysis part 205 does not achieve the position information correction function. On the other hand, in this case, the first example may be employed in the case where it is difficult to perform the positioning by the GPS receiver 111. That is, the autonomous positioning part 201 carries out the autonomous positioning on the basis of the detection values obtained by the sensors, and the integration analysis part 205 achieves the position information correction function.

3. POSITION INFORMATION CORRECTION FUNCTION

Next, the position information correction function that may be achieved in an embodiment will be further described. As described above, the position information correction function may be achieved by the integration analysis part 205 included in the processing part 200.

FIG. 5 is a diagram illustrating a first stage of position information correction according to an embodiment of the present disclosure. FIG. 5 shows a movement trajectory T of a user formed of a group of relative position information acquired by the autonomous positioning part 201. First, the integration analysis part 205 specifies a reference position included in the group of position information on the basis of action recognition information of the user associated with position information. In the example shown in the figure, the integration analysis part 205 specifies reference positions P1 to P4 on the movement trajectory T. The reference positions P1 and P4 are a start point and an end point, respectively, of the group of position information shown by the movement trajectory T. Further, the reference positions P2 and P3 are division points, respectively, of the group of position information, as will be described later.

The reference positions P1 and P4 are each a position at which action recognition information shows that an action related to building equipment has occurred. The building equipment may include, for example, raising and lowering equipment such as a staircase, an elevator, or an escalator, or gateway equipment such as a door. In the example shown in the figure, action recognition information indicates that "getting on and off an elevator" has occurred at the reference position P1. Further, action recognition information indicates that "going up and down a staircase" has occurred at the reference position P4. Such action recognition information may be acquired by analyzing, by the action recognition part 203, the detection values obtained by the acceleration sensor 101 and the pressure sensor 107 included in the input part 100.

The reference position P2 is a position at which a terminal device on which a sensor is mounted has succeeded in communication with a beacon B using a communication device which is separately mounted on the terminal device. The terminal device executes near field communication such as Bluetooth (registered trademark) with the beacon B. The terminal device transmits information indicating that the communication has succeeded with a time stamp to a device (server, for example) that achieves the processing part 200. In this case, the integration analysis part 205 uses the time stamp and can associate the communication result between the terminal device and the beacon B with the position information. Here, since the beacon B is fixed equipment on a floor of the building or the like, it is likely that the terminal device which has succeeded in communicating with the beacon B is at the same position as or close to the position of the beacon B, even though the position information of the beacon B is not known. For the same reason, the integration analysis part 205 may specify, as the reference position, the position at which the terminal device on which the sensor is mounted has succeeded in acquiring absolute position information using the GPS or the like. Also in this case, it is likely that the terminal device that has acquired the common absolute position information is at the same position or the close position.

The reference position P3 is a position at which position information indicates stay of the user for a given time period or more. In this way, the integration analysis part 205 may specify, as the reference position, a singular point that appears in the group of position information. As the singular point, there may be additionally given a point at which the travelling direction or the movement speed of the user remarkably switches. Note that a similar singular point may be specified not on the basis of the group of position information but on the basis of the action recognition information. Further, the integration analysis part 205 may also specify the singular point by performing analysis by combining the group of position information with the action recognition information.

FIG. 6 is a diagram illustrating a second stage of position information correction according to an embodiment of the present disclosure. FIG. 6 shows sections S1 to S3 that divide the movement trajectory T of the user using the reference positions P1 to P4 as references. In an embodiment, the integration analysis part 205 divides a group of position information into a plurality of sections as references reference positions as references, averages divided parts of the group of position information between a plurality of action logs, and thereby corrects the group of position information.

FIG. 7 is a diagram illustrating a third stage and a fourth stage of position information correction according to an embodiment of the present disclosure. In the case where the number of action logs acquired by the autonomous positioning part 201 and the action recognition part 203 is two or more, the action logs being provided by different users or being provided at different times (and may be provided by the same user), the integration analysis part 205 carries out processes of the first stage and the second stage for each of the plurality of action logs. In this way, the plurality of sections (hereinafter, also referred to as segments) obtained by dividing the group of position information using reference positions as references are generated in large numbers.

Here, as the third stage, the integration analysis part 205 performs clustering of the segments (divided parts of the group of position information). With the clustering, the segments whose features are similar to each other are classified into the same cluster. The feature of the segments includes, for example, a kind of action (indicated by the action recognition information) corresponding to the reference positions before and after the section, position information of reference positions before and after the section, or a movement distance or a movement time period indicated by the group of position information included in the segments. For example, in the example of the movement trajectory T shown in FIG. 5 and FIG. 6, in the case where the group of position information included in an action log of another user is also divided into a section from the reference position P1 to the reference position P2, the segment corresponding to this section may also be classified into the same cluster as the segment corresponding to the section S1 into which the movement trajectory T is divided. However, those segments may not be classified into the same cluster in the case where the movement distance or the movement time period indicated by the group of position information differ greatly from each other. The segments whose features are similar to each other are classified into the same cluster, and the segments classified into the same cluster is subjected to averaging to be described later, to thereby prevent performing averaging by mistake the segments which actually indicate the movements at different positions. The segments including irregular motions of the user are used for the averaging to thereby prevent a noise from being mixed in the result of the averaging.

Subsequently, as shown in FIG. 7, the integration analysis part 205 carries out averaging of the group of position information between the segments classified into the same cluster. In the example shown in the figure, parts of movement trajectories T1, T2, and T3 corresponding to segments included in respective three different action logs are moved side by side, moved rotationally, and enlarged or reduced so as to come closer to a central coordinate group T_AVE. According to such an operation, the following can be corrected, for example: an error in an initial value of speed or direction at a start point of the group of position information corresponding to each segment; and accumulation of errors caused by difference in sensitivities of sensors. The central coordinate group T_AVE can be calculated, for example, by determining an arithmetic mean of coordinates shown by the group of position information included in each of the plurality of action logs for each position.

At this time, the coordinates shown by each group may be assigned with a weight in accordance with the reliability of the position information, and then the arithmetic mean may be determined. In this case, the coordinates shown by position information having higher reliability have larger influence on the central coordinate group T_AVE.

FIG. 8 is a diagram illustrating an effect of position information correction according to an embodiment of the present disclosure. In the example shown in the figure, a movement trajectory T' shown by the group of position information of the user obtained by autonomous positioning is corrected to the movement trajectory T. Since the group of position information constituting the movement trajectory T' is determined relatively by the autonomous positioning, a set value of speed or direction at a start point may not be appropriate or errors included in detection values obtained by sensors may be accumulated, and hence, the movement trajectory T' may deviate from the actual position. In the example shown in the figure, the set value of the direction of the user at the start point is not appropriate, and accordingly, the movement trajectory T' deviates from the original movement trajectory in a way that the movement trajectory T' rotates having the start point as its center.

In order to correct the error in the result of the autonomous positioning, there is given, for example, a method of carrying out absolute positioning using GPS or the like at two or more points, and correcting the group of position information using those points as references. However, in an environment in which it is difficult to use the absolute positioning using GPS or the like, such as an indoor site, it is not easy to employ such a method. Accordingly, in an embodiment, a reference position for correcting the group of position information is specified on the basis of action recognition information acquired in association with the position information. The action recognition information can be acquired at an indoor site and an outdoor site as long as the user carries or wears a terminal device on which a sensor is mounted, and hence, any number of reference positions can be specified out of the positions included in the group of position information.

Here, in the case where only two points of reference positions are specified, for example, it is also possible to carry out correction using averaging between a plurality of action logs for the group of position information between the two points. However, in the case where the group of position information includes position information of a relatively large region, for example, the shape of the trajectory constituted by the group of position information becomes complex, and it is difficult to correct the group of position information by side-by-side movement, rotation movement, enlargement or reduction, and the like. Therefore, in an embodiment, the reference positions represent the start point, the end point, and the division points of the group of position information, and, using the reference positions as references, averaging is carried out for each of the plurality of sections into which the group of position information is divided. In this way, as shown in the example shown in FIG. 7, for example, the shape of the movement trajectory to be corrected becomes simple, and it becomes easy to calculate an average movement trajectory and to perform correction by side-by-side movement, rotation movement, enlargement or reduction, and the like.

Further, the group of position information included in each of the plurality of action logs does not always include only the group generated by regular movement in the same course. For example, the courses partly having the same parts with each other may have different parts from the midway (for example, users entering an office and then going to the respective desks), or irregular motions of the user (for example, the user suddenly stops or drop in on the way) may be included. If the group of position information generated in those cases is used for the averaging, this becomes a noise with respect to the group generated by regular movement, and the position information may not be corrected appropriately. Therefore, in an embodiment, the group of position information is divided into a plurality of sections using the reference positions as references, and, in the case where the features of the divided parts of the group of position information are similar to each other, the averaging is carried out in the group of position information.

4. MODEL LEARNING FUNCTION

Next, the model learning function that may be achieved in an embodiment will be further described. As described above, the model learning function may be achieved by the integration analysis part 205 included in the processing part 200.

FIG. 9 and FIG. 10 are each a diagram illustrating a model learning function according to an embodiment of the present disclosure. In FIG. 9, a state ST of a user is shown, which is defined by position information and action recognition information. A model of an action of the user learned by the integration analysis part 205 may be, for example, as in the example shown in the figure, a probability model defined by a state ST, an observation probability of a position and an observation probability of the action in the state ST, and a transition probability between states. For showing the relationship between the state ST and the position information of the user, FIG. 9 also shows the movement trajectory T of the user.

Note that, in an embodiment, the model learning function may be achieved independently of the position information correction function. That is, the position information of the user shown by the movement trajectory T in FIG. 9 may be provided by, for example, the position information acquired by the autonomous positioning part 201 of the first example of the above-mentioned functional configuration being corrected by the position information correction function achieved by the integration analysis part 205. Further, the position information of the user may be provided by the position information acquired by the autonomous positioning part 201 being corrected using a method different from the above-mentioned position information correction function, or the position information of the user may be the position information as it is acquired by the autonomous positioning part 201. Alternatively, the position information of the user may be position information obtained by a GPS, which is acquired by the position information acquisition part 211 of the second example of the above-mentioned functional configuration.

In an embodiment, for the model learning of an action, a probability model such as a Hidden Markov Model (HMM) is used. The HMM is a model formed of a state, an observation probability, and a transition probability. The observation probability expresses, as a probability, the coordinates (position) at which each state takes place and what action occurs. The transition probability indicates the probability that a certain state changes into another state or the probability of a self-transition. The integration analysis part 205 defines the state on the basis of a set of position information and action recognition information associated with the position information, the position information being included in a plurality of action logs provided by different users or provided at different times (and may be provided by the same user). Since the state is defined not only by the position information, there may be cases where different states are defined at the same position in an overlapped manner.

FIG. 10 shows a figure extracting three states ST1 to ST3 present at the part encircled by the dashed line in FIG. 9. In FIG. 10, regarding the state ST3, an observation probability $P_{OB}$ includes an average and a standard deviation (represented by small letter sigma in the figure) of each of the coordinates (latitude and longitude), and an observation probability of action recognition results. Note that the observation probability $P_{OB}$ may also include, in addition to the items in the example shown in the figure, an observation probability of an extrinsic attribute such as time, a day of the week, a season, facilities, or a user attribute. That is, in an embodiment, the probability model may further be defined by an observation probability of an extrinsic attribute in each state. On the other hand, FIG. 10 shows that, regarding the state ST2, transition probabilities $P_T$ are as follows: to the state ST1 is 22%; to the state ST3 is 27%; and to the downward state (not shown) is 24%, and a self-transition probability $P_{ST}$ is 27%.

FIG. 11 and FIG. 12 are each a diagram illustrating estimation of a location attribute based on a model of a state according to an embodiment of the present disclosure. In an embodiment, the information generation part 207 included in the processing part 200 may generate information based on a model learned by the integration analysis part 205. For example, the information generation part 207 generates information indicating a location attribute of a position shown by position information included in an action log.

FIG. 11 shows a state in which the state ST shown in FIG. 9 is classified into a state ST_P corresponding to a location attribute of a pathway and a state ST_E corresponding to a location attribute of an elevator. For example, with the processing of the model learning of an action described with reference to FIG. 9 and FIG. 10, a state ST, observation probabilities of a position and an action in the state ST, and a transition probability between states are defined. Here, using features extracted from the observation probability and the transition probability of the state ST as the input, a score of each location attribute is calculated using an identification function. As a result, the state ST of the example shown in the figure is classified into the state ST_P corresponding to the location attribute the pathway and the state ST_E corresponding to the location attribute of the elevator. Note that the features of the state ST may include, for example, an observation probability of an action, an observation probability of an action in a state at a destination, an entropy of a transition probability, and the number of users corresponding to the state ST (the number of users per day, the number of unique users, a total number of users, and the like).

FIG. 12 shows an example of calculating a score of each location attribute using the identification function. For example, in the case where, regarding the state ST defined by a certain area, location attribute labels PL1 to PL3 corresponding to respective states are given, machine learning using techniques such as a support vector machine (SVM) and AdaBoost is carried out on the basis of those states and location attribute labels, and thus, an identification function C(x) for each location attribute can be defined. To be more specific, the identification function C(x) is generated by the learning such that, when a feature quantity x of a certain state ST is input, the location attribute label PL given to the state ST has the highest score. In the example shown in the figure, there are shown an identification function $C_{elevator}(x)$ for identifying a location attribute label "elevator", an identification function $C_{pathway}(x)$ for identifying a location attribute label "pathway", and the like.

FIG. 13 is a diagram illustrating an example of a use of a location attribute according to an embodiment of the present disclosure. In the example shown in FIG. 13, location attributes of a conference room, a desk, and a pathway in a floor of a building are estimated. Under such a situation, in the case where the action of the user accompanying the movement trajectory T of moving from the desk to the conference room is detected, for example, the action of the user can be estimated that the user has been in the state of working at the desk and then has moved to the conference room to participate in a meeting. In this way, the information generation part 207 may generate information indicating an action recognized on the basis of an action log including position information and action recognition information associated with the position information, and a location attribute estimated as a result of model learning of an action of the user based on the action log. In the example described above, although the action recognition part 203 carries out the action recognition using the detection values obtained by the sensors, it is difficult in this case to recognize a high-order action of the user with high accuracy, such as during work, shopping, and eating. Accordingly, by combining results obtained by the model learning of the action of the user and the estimation of the location attribute, and by carrying out further action recognition, it becomes possible to recognize a high-order action of the user with high accuracy.

Further, in another example, the information generation part 207 may also generate information based on a score of an action for each position calculated on the basis of an observation probability of a position and an observation probability of the action in a model. The score is calculated, for example, by adding observation probabilities of the action in each state in accordance with the average and the variance of the positions. For example, the information generation part 207 may generate information indicating an action representing a position, which is specified on the basis of the score. The action representing a position may be an action having the highest score. Further, for example, the information generation part 207 may generate information showing frequency distribution of an action at a position based on a score. The frequency distribution may be generated in accordance with the score of each action.

FIG. 14 is a diagram illustrating correction of a result of action recognition using a score of an action according to an embodiment of the present disclosure. In the example shown in FIG. 14, action recognition information included in an action log includes information indicating transportation means (train, bus, or car) of the user. Further, position information included in the action log indicates the movement trajectory T. Still further, on the basis of an action log that has been acquired in the past, a model is learned including an observation probability of each transportation means (train, bus, or car). In this case, a score of transportation means (train, bus, or car) for each position can be calculated on the basis of the observation probability of a position and an action in the model. The score is expressed on a map on the basis of the observation probability of the position in each state, and thus, the map indicating tendency of transportation means (train, bus, or car) recognized at each position can be generated.

In the example shown in the figure, regions having high scores of the respective transportation means are shown as R_train, R_Bus, and R_Car, respectively. Note that, although the respective regions are expressed in a uniform hatching for convenience of printing, levels of the score for each position within the region may be expressed in practice. That is, a region having a high score of each transportation means and a region having a score, which is not high, of each transportation means may be included within the regions R_train, R_Bus, and R_Car. Further, scores of multiple transportation means may be expressed for each position.

Here, for example, in the case where the action recognition information associated with the movement trajectory T indicates that the transportation means is the train even though the movement trajectory T of the user is mainly passing the region R_Car, the information generation part 207 may correct the result of the action recognition from the train to the car. Such processing can be also performed in the case where regions of railways and roads are already given on the map, for example, but it is not easy to acquire such information for the entire map and to further update the information as necessary. An embodiment can generate a map showing a tendency of an action recognized for each position with the model learning of a state as described above, and thus can easily carry out correction of the result of the action recognition on the basis of the position information.

As a more specific method of correcting the result of the action recognition, for example, the information generation part 207 may generate information indicating an action recognized on the basis of a score calculated by assigning weights to a score of an action indicated by the action recognition information acquired by the action recognition part 203 and a score of an action indicated by the probability model learned by the integration analysis part 205, and adding those scores. For example, in the example shown in FIG. 14, in the case where the scores of the actions indicated by the action recognition information are "train=0.5 and car=0.25", the scores (scores corresponding to positions on the movement trajectory T on the map) of the actions indicated by the probability models are "train=0.25 and car=0.75", and a weight of 0.5 is assigned to each of the scores and the scores are added together, the score of the train is 0.5×0.5+0.25×0.5=0.375 and the score of the car is 0.25×0.5+0.75×0.5=0.5. Accordingly, the result of the action recognition is corrected from the train to the car.

FIGS. 15 to 17 are each a diagram illustrating presentation of information using a score of an action according to an embodiment of the present disclosure. A screen 1100 described with reference to FIGS. 15 to 17 is displayed as an image on the display 301 included in the output part 300, for example.

FIG. 15 shows, in the screen 1100, a map 1101, an action kind box 1103, a day box 1105, and a time period box 1107. As described above, in an embodiment, a model of an action of the user learned by the integration analysis part 205 may be a probability model defined by a state of the user, an observation probability of a position and an observation probability of the action in the state, and a transition probability between states. Further, the probability model may further be defined by an observation probability of an extrinsic attribute in each state. In this case, the information generation part 207 can generate information by filtering the observation probability of the action in accordance with the extrinsic attributes.

In FIG. 16, in the screen 1100 shown in FIG. 15, "car", "bus", and "train" are selected in the action kind box 1103, Monday to Friday is selected in the day box 1105, and 6:00 to 10:00 is selected as the time period. In this case, in the map 1101, the regions R_train, R_Bus, and R_Car having high scores in the selected action kinds (train, bus, and car) in the selected days and time period are displayed in an overlaid manner. As described above, the scores are each calculated by, for example, adding the observation probabilities of the action in each state in accordance with the average and the variance of the positions. In this case, the observation probabilities of the action are assigned with weights in accordance with the observation probabilities of the selected days and time period, and then are added.

Note that, although the regions R_train, R_Bus, and R_Car are expressed in a uniform hatching for convenience of printing, levels of the score for each position within the region may be expressed in practice. The levels of the score may be expressed by a heat map or a contour map, for example. Further, in the case where scores for multiple transportation means are calculated for each position, regarding the display of the regions R_train, R_Bus, and R_Car, the action having the highest score may be selected.

FIG. 17 shows examples of boxes other than the action kind box 1103, the day box 1105, and the time period box 1107 shown in the examples of FIG. 15 and FIG. 16. For example, as the example shown in the figure, the screen 1100 may display an age box 1109, a sex box 1111, or an occupation box 1113 together with or in the place of the boxes shown in FIG. 15. For example, in the case where the probability model is defined by observation probabilities of extrinsic attributes including an age, a sex, and an occupation in each state, the information generation part 207 can generate information by filtering the observation probability of the action in accordance with those attributes.

Note that the presentation of information like the screen 1100 described with reference to FIGS. 15 to 17 is also possible in the case where the integration analysis part 205 does not learn an action model of a user. For example, in the case where the number of action logs is two or more, the action logs being provided by different users or being provided at different times (and may be provided by the same user), the integration analysis part 205 may calculate a score corresponding to a frequency of an action indicated by action recognition information associated with position information indicating same positions or positions close to each other in the plurality of action logs. Also in this case, the information generation part 207 can achieve the presentation of the information like the screen 1100 described with reference to FIGS. 15 to 17 by handling the calculated score in the same manner as the score of the action in the above example.

As the examples described above, by learning the model of the action of the user at the position indicated by the position information on the basis of the position information and the action recognition information, pieces of action recognition information included in the plurality of action logs provided by different users or provided at different times (and may be provided by the same user) can be combined through position information associated with each piece of action recognition information. Being provided with such a model, a location attribute of the position indicated by the position information included in the action log can be estimated, and the accuracy of the action recognition information can be enhanced by using the estimated location attribute, for example. Further, information based on a score of an action for each position calculated on the basis of the observation probability of a position and an observation probability of an action in a model can also be generated.

5. MAP GENERATION FUNCTION

Next, the map generation function that may be achieved in an embodiment will be further described. As described above, the map generation function may be achieved by the integration analysis part 205 included in the processing part 200.

The integration analysis part 205 which achieves the map generation function generates a map for placing information based on action recognition information on the basis of at least position information included in an action log. Note that, in the case where the position information is associated with an existing map on the basis of a result of absolute positioning using a GPS, the map generation function may not be achieved. In this case, the information generation part 207 may generate information in which the information based on the action recognition information is placed on the existing map. Also according to such processing, the information such as the screen 1100 described with reference to FIGS. 15 to 17, for example, can be generated.

That is, the map generation function may be achieved independently of the model learning function and the information generation function. The integration analysis part 205 which achieves the map generation function newly generates a map based on position information included in an action log in the case where the position information is not associated with the existing map (including the case where the existing map does not exist), for example.

As a simple example, the integration analysis part 205 which achieves the map generation function may generate a map on the basis of the movement trajectory of the user formed of a group of position information as shown in FIG. 5, for example. Note that the map generation function may also be achieved independently of the position information correction function. That is, the integration analysis part 205 may correct position information acquired by the autonomous positioning part 201 in the first example of the functional configuration by the position information correction function and may use the corrected position information for the map generation function to be described below, or may correct the position information by a method different from the position information correction function and may use the corrected position information for the map generation function. Alternatively, the integration analysis part 205 may use the position information acquired by the autonomous positioning part 201 for the map generation function as it is. Further, the integration analysis part 205 may use the position information acquired by the GPS, which is acquired by the position information acquisition part 211 in the second example of the functional configuration, for the map generation function (for example, in the case of generating a map more detail than an existing map).

Here, for example, the integration analysis part 205 which achieves the map generation function may generate, in the case where the position information includes a plurality of groups of position information having different altitudes, a map which is divided for each group of position information. For example, the position information may include information of the latitude, the longitude, and the altitude (those values may be global or local), however, in the case where a plurality of groups of position information having different altitudes (exceeding a range of error) are included in the pieces of position information included in a plurality of action logs provided by different users or provided at different times (and may be provided by the same user), the integration analysis part 205 may divide the map so as to correspond to those pieces of position information. To be specific, in the case where the groups of position information acquired at different floors of a building are included in the action log, the map may be divided.

Further, the integration analysis part 205 which achieves the map generation function may generate a map further on the basis of action recognition information included in the action log. Examples (map division) for that case will be described below.

FIG. 18 is a diagram illustrating a first stage of map division according to an embodiment of the present disclosure. FIG. 18 shows a state ST, which is defined by the model learning of an action as described with reference to FIG. 9 and FIG. 10, for example, and a link L, which connects states ST that are in transition relationship with each other. In the example shown in the figure, a graph structure, which is formed by the states ST being connected with each other via the links L, is divided by a geofence GF. To be more specific, a link L that crosses the geofence GF is set as a division point. The geofence GF may be given information indicating a geographical boundary such as an area of a building within the map, for example. As information indicating a geographical boundary within the map in the same manner as the geofence GF, altitude information of each floor in the building may be used, for example. In the case where the altitude is included in the feature quantity of the state ST, the link L that crosses the altitude corresponding to the boundary between the floors is set as the division point, and thus, the graph structure is divided. In this way, in the first stage, an action map is divided on the basis of given information such as available external map information, information designated manually by the user, or the like.

FIG. 19 is a diagram illustrating a second stage of map division according to an embodiment of the present disclosure. In FIG. 19, the region outside the region geofence GF which is divided in the first stage is shown as a region R1. In the example shown in the figure, the graph structure of the states ST in the remaining region is further divided at a position indicating an action related to building equipment has occurred. The building equipment may include, for example, raising and lowering equipment such as a staircase, an elevator, or an escalator, or gateway equipment such as a door. In the example shown in the figure, the link L connected with a state ST_DOOR is set as the division point. The state ST_DOOR is a state in which an action of "opening/closing of door" is recognized by action recognition. In the case of attempting to divide the action map for each room within the building, for example, it is appropriate to divide the map at positions corresponding to doors. Note that, also in the same manner as in the region R1, the graph structure of states ST may further be divided at a position of a state indicating a result of a specific action recognition.

FIG. 20 is a diagram illustrating a third stage of map division according to an embodiment of the present disclosure. In FIG. 20, regions obtained by the division in the first and second stages are shown as regions R1 and R2, respectively. In the example shown in the figure, the graph structure of the states ST in the remaining region is further divided on the basis of similarity between states. In the example shown in the figure, in the graph structure of the states ST in the remaining region, a link L between states which are determined that the similarity therebetween is lower than a given threshold (that the states are not similar) is set as a division point, and the map is divided into two regions. That is, the map is divided between positions whose states indicating actions of a user at each position are not similar. Hereinafter, there will be further described a method of generating a similarity function for determining whether states are similar by learning position information and action recognition information.

In the example shown in the figure, first, for creating the similarity function, a label is given to a state ST defined by a certain area. The label to be given here may include "private room", "conference room", "corridor", or the like. Note that, although it is similar to the processing of giving the location attribute label described with reference to FIG. 12 in the point that a label is given to a state ST, the contents of the label may be different from those of the example shown in FIG. 12. The label that has been given in the example of FIG. 12 has been used for the action recognition, but on the other hand, the label to be given here is used for the division of the action map. Accordingly, for example, in the example shown in FIG. 12, the state to which the label of "desk" is given may be provided with the label of "private room" (in order to divide the map in terms of the entire private room including a desk, not in terms of individual desk). The similarity function is created as a distance function D such that a similarity score is high when two states having the same label are input and the similarity score is low when two states having different labels are input, for example. To be more specific, the distance function D is created using a technique such as Distance Metric Learning, for example, such that in the case where feature quantities x1 and x2 of two states ST1 and ST2 are input, the score calculated by the distance function D (x1, x2) becomes the above-described similarity score.

FIG. 21 is a diagram showing a result of map division according to the first to third stages. The region R1 is the region defined in the first stage by the action map being divided by the geofence GF. The region corresponds to the outside of the building, for example. The region R2 is the region defined in the second stage by the action map being divided at the position of the state ST_DOOR indicating a characteristic action recognition result (opening/closing of door). The region corresponds to the region of a pathway inside the building, for example. The regions R3 and R4 are each a region defined in the third stage by the action map being divided on the basis of the similarity between states. The regions correspond to, for example, rooms inside the building (private room and conference room) whose purposes are different from each other. According to the processing including the first to third stages, the action map including regions belonging to various attributes, such as the regions R1 to R4, can be appropriately divided.

Note that the examples of the regions are merely examples. For example, all the regions included in the action map may be placed inside the building, or all the regions may be placed outside the building. Further, as described above, all the regions that have been divided in the first stage may further be divided in the second stage. In the same manner, all the regions that have been divided in the first stage or the second stage may further be divided in the third stage.

FIG. 22 is a diagram illustrating an effect of action map division according to an embodiment of the present disclosure. FIG. 22 shows an example (MAP_A) of an action map before the division and an example (MAP_B) of an action map after the division. Note that, in those action maps, the illustration of the states are omitted, and only a link (movement trajectory) based on transition is shown.

The action map of the example shown in the figure includes two buildings (building A and building B) and an outdoor site, which is the outside of the two buildings, and, with the processing of the first to third stages, the division is performed into the region of the outdoor site and the regions of the floors of each building. The action map is divided in this manner, and thus, it becomes easy to view a desired limited area of the action map as the case of displaying two-dimensional action map that looks down upon a floor of the building, for example. Further, the action map is separated between the inside of the building and the outside of the building, and thus, it becomes possible to carry out an analysis using actions and location attributes unique to each of the inside of the building and the outside of the building.

6. PROCESSING FUNCTION OF ASSOCIATING POSITION INFORMATION WITH BUILDING EQUIPMENT

In an embodiment, the integration analysis part 205 included in the processing part 200 may achieve an association processing function of associating building equipment to position information on the basis of action recognition information. In this case, the autonomous positioning part 201 or the position information acquisition part 211 achieves a position information acquisition function of acquiring position information of a user. Further, for example, action recognition part 203 achieves an action recognition information acquisition function of acquiring the action recognition information showing that an action of the user related to building equipment has occurred.

For example, in the position information correction function and the map generation function which have already been described above, the examples showing the action related to the building equipment using the action recognition information have been described. In those examples, a position indicating that an action related to building equipment has occurred is used as a reference point for correcting a group of position information and as a division point of a map. Also in those functions, it may be said that the association processing function has been achieved.

On the other hand, in an embodiment, the association processing function may be achieved independently of the position information correction function and the map generation function by the integration analysis part 205. Hereinafter, the association processing function will be described, and also an example of a recognizing technique of an action of a user related to the building equipment will also be described. Such a technique can be used not only in the case where the association processing function is achieved independently, but also in the case where the association processing function is achieved together with the position information correction function and the map generation function.

In an embodiment, the autonomous positioning part 201 may achieve the position information acquisition function of acquiring position information of a user. As described above, the autonomous positioning part 201 acquires position information by performing autonomous positioning based on sensing information of the user including detection values obtained by the acceleration sensor 101, the gyro sensor 103, and the geomagnetic sensor 105 (motion sensor) which are included in the input part 100. Alternatively, the position information acquisition part 211 may achieve the position information acquisition function. The position information acquisition part 211 acquires position information provided by the GPS receiver 111 included in the input part 100.

Further, in an embodiment, the action recognition part 203 may achieve the action recognition information acquisition function of acquiring the action recognition information which is generated on the basis of the sensing information of the user associated with position information and which shows that an action of the user related to building equipment has occurred. For example, in the case where the position information acquisition function is achieved by the autonomous positioning part 201, since the sensing information to be input to the action recognition part 203 may be common to the sensing information to be input to the autonomous positioning part 201, it may be said that the sensing information is associated with the position information. Further, also in the case where the position information acquisition part 211 achieves the position information acquisition function, the sensing information can be associated with the position information using a time stamp and the like.

As described above, the action recognition part 203 acquires action recognition information by performing action recognition based on the detection values obtained by the acceleration sensor 101, the gyro sensor 103, and the geomagnetic sensor 105 (motion sensors), and the pressure sensor 107. As the technique of the action recognition, any known configuration may be employed, and, for example, the action recognition part 203 may acquire the action recognition information by referencing a motion model corresponding to the action of the user related to the building equipment and executing pattern recognition and the like of the detection values obtained by the sensors. Note that, in another example, in the case where the action recognition part 203 and the integration analysis part 205 are achieved by separate devices, the action recognition information acquisition function is achieved by a communication device which receives the action recognition information in the device achieving the integration analysis part 205.

FIG. 23 is a diagram illustrating detection of an action related to an elevator according to an embodiment of the present disclosure. FIG. 23 shows accelerations $a_x$, $a_y$, and $a_z$ of three axes provided by the acceleration sensor 101, and a gravity direction component $a_g$ of the accelerations of the three axes. In the example shown in the figure, the gravity direction component as of the accelerations is obtained by projecting the accelerations $a_x$, $a_y$, and $a_z$ of the three axes in the gravity direction, and removing a gravity acceleration component. Here, in the case where a user is on an elevator, a variance of acceleration values in the accelerations $a_x$, $a_y$, and $a_1$ of the three axes becomes small, and a specific pattern appears on the gravity direction component $a_g$ of the accelerations. The specific pattern may occur in a response to acceleration and deceleration of the elevator. The section that matches such a condition is shown as a section Ev in the figure.

In the case where the section Ev is observed, the action recognition information acquired by the action recognition part 203 may show that an action of the user related to the elevator has occurred. For example, the action recognition information may show the occurrence of the action of "moving on the elevator" over the entire section Ev, or may also show the occurrence of the action of "getting on the elevator" at the start point of the section Ev and the occurrence of the action of "getting off the elevator" at the end point of the section Ev.

FIG. 24 is a flowchart showing an example of processing of detecting an action related to an elevator according to an embodiment of the present disclosure. Referring to FIG. 24, the action recognition part 203 calculates an average avg and a variance var in detection values obtained by the acceleration sensor (S101). Here, in the case where the variance var is smaller than a given threshold V and the average avg is in a given range (A1 to A2) (YES in S103), the action recognition part 203 further extracts change in the acceleration in the gravity direction (S105). As described above, the change in the acceleration in the gravity direction is calculated on the basis of the detection values obtained by the acceleration sensor 101. In the case where a specific pattern appears in the change in the acceleration in the gravity direction (YES in S107), the action recognition part 203 detects an action related to the elevator (S109), and generates action recognition information indicating the action.

FIG. 25 is a diagram illustrating detection of an action related to a staircase according to an embodiment of the present disclosure. In FIG. 25, there are shown a detection value Pa of pressure provided by the pressure sensor 107, a classification C (up/down) recognized on the basis of the detection value Pa, a classification C (walk/still) recognized on the basis of a detection value obtained by the acceleration sensor 101, and a classification C (stairs) of staircase up/staircase down determined on the basis of the classification C (up/down) and the classification C (walk/still). In the example shown in the figure, in the case where it is shown that the user is in the walk state in the classification C (walk/still) and the user is in the state of moving (up or down) in the gravity direction, the action of the user related to the staircase is detected. The section which matches such a case is shown as a section St in the figure.

In the case where the section St is observed, the action recognition information acquired by the action recognition part 203 may show that the action of the user related to the staircase has occurred. For example, the action recognition information may show the occurrence of the action of "going up/down the staircase" over the entire section St, or may also show the occurrence of the action of "start going up/down the staircase" at the start point of the section St, and the occurrence of the action of "finish going up/down the staircase" at the end point of the section St.

FIG. 26 is a flowchart showing an example of processing of detecting an action related to a staircase according to an embodiment of the present disclosure. Referring to FIG. 26, first, the action recognition part 203 executes processing of detecting user's walking on the basis of a detection value obtained by the acceleration sensor 101 (S201). Note that, for the processing of detecting the direction of the user, various known techniques can be used. Here, in the case where the user's walking is detected (YES in S203), the action recognition part 203 further executes processing of detecting a user's movement in the gravity direction on the basis of a detection value obtained by the pressure sensor 107 (S205). As shown in FIG. 25, the user's movement in the gravity direction may be determined by an amount or a rate of increase or decrease in the detection value (pressure) obtained by the pressure sensor 107. In the case where the user's movement in the gravity direction is detected (YES in S207), the action recognition part 203 detects the action related to the staircase (S209), and generates the action recognition information indicating the action.

As already described above, the association processing function of associating building equipment with position information may be achieved independently of other functions such as the position information correction function and the map generation function. For example, the position information acquired by the autonomous positioning part 201 corrected by a method different from the position information correction function may be associated with the building equipment by the association processing function. Further, in the case where the position information acquired by the autonomous positioning part 201 or the position information acquisition part 211 already has sufficient accuracy, the association processing function may associate the position information acquired by the position information acquisition function with the building equipment as it is. For example, even if the map is not generated, it becomes easy for the user to grasp a series of actions in a corresponding manner to an actual environment by associating the building equipment together with information indicating another action of the user with the position information.

7. SYSTEM CONFIGURATION

Heretofore, an embodiment of the present disclosure has been described. As described above, the system 10 according to an embodiment includes the input part 100, the processing part 200, and the output part 300, and those structural elements are achieved by one or multiple information processing apparatuses. Hereinafter, examples of combinations of information processing apparatuses for achieving the system 10 will be described with reference to more specific examples.

First Example

FIG. 27 is a block diagram showing a first example of a system configuration according to an embodiment of the present disclosure. With reference to FIG. 27, the system 10 includes information processing apparatuses 11 and 13. The input part 100 and the output part 300 are achieved by the information processing apparatus 11. On the other hand, the processing part 200 is achieved by the information processing apparatus 13. The information processing apparatus 11 and the information processing apparatus 13 communicate with each other through a network for achieving a function according to an embodiment of the present disclosure. An interface 150b between the input part 100 and the processing part 200, and an interface 350b between the processing part 200 and the output part 300 may each be a communication interface between devices.

In the first example, the information processing apparatus 11 may be a terminal device, for example. In this case, the input part 100 may include an input device, a sensor, software for acquiring information from an external service, and the like. The software for acquiring information from an external service acquires data from application software of a service executed by the terminal device, for example. The output part 300 may include an output device, a control device, software for providing information to an external service. The software for providing information to an external service may provide the information to application software of a service executed by the terminal device, for example.

Further, in the first example, the information processing apparatus 13 may be a server. The processing part 200 is achieved by a processor or a processing circuit included in the information processing apparatus 13 operating in accordance with a program stored in memory or a storage device. The information processing apparatus 13 may be a device used as a server, for example. In this case, the information processing apparatus 13 may be installed in a data center and may be installed in the home. Alternatively, the information processing apparatus 13 may be a device which does not achieve the input part 100 and the output part 300 regarding the functions according to an embodiment of the present disclosure, but can be used as a the terminal device regarding the other functions.

Second Example

FIG. 28 is a block diagram showing a second example of a system configuration according to an embodiment of the present disclosure. Referring to FIG. 28, the system 10 includes information processing apparatuses 11a, 11b, and 13. The input part 100 is achieved separately by input parts 100*a* and 100*b*. The input part 100*a* is achieved by the information processing apparatus 11*a*. The input part 100*a* may include, for example, the acceleration sensor 101, the gyro sensor 103, the geomagnetic sensor 105, the pressure sensor 107, and/or the GPS receiver 111 described above.

The input part 100*b* and the output part 300 are achieved by the information processing apparatus 11*b*. The input part 100*b* may include the operation input device 109 described above, for example. Further, the processing part 200 is achieved by the information processing apparatus 13. The information processing apparatuses 11*a* and 11*b* and the information processing apparatus 13 communicate with each other through a network for achieving a function according to an embodiment of the present disclosure. Interfaces 150*b*1 and 150*b*2 between the input part 100 and the processing part 200, and an interface 350*b* between the processing part 200 and the output part 300 may each be a communication interface between devices. However, in the second example, since the information processing apparatus 11*a* and the information processing apparatus 11*b* are separate devices, the kinds of interfaces included are different between: the interface 150*b*1; and the interface 150*b*2 and the interface 350*b*.

In the second example, the information processing apparatuses 11*a* and 11 *b* may each be a terminal device, for example. The information processing apparatus 11*a* is carried or worn by a user, for example, and performs sensing on the user. On the other hand, the information processing apparatus 11*b* outputs, to the user, information generated by the information processing apparatus 13 on the basis of results of the sensing. In this case, the information processing apparatus 11*b* accepts a user's operation input related to information to be output. Accordingly, the information processing apparatus 11*b* may not necessarily be carried or worn by the user. Further, the information processing apparatus 13 may be, in the same manner as the first example, a server or a terminal device. The processing part 200 is achieved by a processor or a processing circuit included in the information processing apparatus 13 operating in accordance with a program stored in memory or a storage device.

Third Example

FIG. 29 is a block diagram showing a third example of a system configuration according to an embodiment of the present disclosure. Referring to FIG. 29, the system 10 includes information processing apparatuses 11 and 13. In the third example, the input part 100 and the output part 300 are achieved by the information processing apparatus 11. On the other hand, the processing part 200 is achieved dispersedly by the information processing apparatus 11 and the information processing apparatus 13. The information processing apparatus 11 and the information processing apparatus 13 communicate with each other through a network for achieving a function according to an embodiment of the present disclosure.

As described above, in the third example, the processing part 200 is achieved dispersedly between the information processing apparatus 11 and the information processing apparatus 13. To be more specific, the processing part 200 includes processing parts 200*a* and 200*c* achieved by the information processing apparatus 11, and a processing part 200*b* achieved by the information processing apparatus 13. The processing part 200*a* executes processing on the basis of information provided by the input part 100 through an interface 150*a*, and provides the processing part 200*b* with a result obtained by the processing. The processing part 200*a* may include, for example, the autonomous positioning part 201 and the action recognition part 203 described above. On the other hand, the processing part 200*c* executes processing on the basis of information provided by the processing part 200*b*, and provides the output part 300 with a result obtained by the processing through an interface 350*a*. The processing part 200*c* may include, for example, the information generation part 207 described above.

Note that, although both the processing part 200*a* and the processing part 200*c* are illustrated in the example shown in the figure, only any one of those may be present in practice. That is, the information processing apparatus 11 may achieve the processing part 200*a* but may not achieve the processing part 200*c*, and information provided by the processing part 200*b* may be provided to the output part 300 as it is. In the same manner, the information processing apparatus 11 may achieve the processing part 200*c* but may not achieve the processing part 200*a*.

Interfaces 250*b* are interposed between the processing part 200*a* and the processing part 200*b*, and between the processing part 200*b* and the processing part 200*c*, respectively. The interfaces 250*b* are each a communication interface between devices. On the other hand, in the case where the information processing apparatus 11 achieves the processing part 200*a*, the interface 150*a* is an interface inside a device. In the same manner, in the case where the information processing apparatus 11 achieves the processing part 200*c*, the interface 350*a* is an interface inside a device. In the case where the processing part 200*c* includes the information generation part 207 as described above, a part of information from the input part 100, for example, information from the operation input device 109 is directly provided to the processing part 200*c* through the interface 150*a*.

Note that the third example described above is the same as the first example except that one of or both of the processing part 200*a* and the processing part 200*c* is or are achieved by a processor or a processing circuit included in the information processing apparatus 11. That is, the information processing apparatus 11 may be a terminal device. Further, the information processing apparatus 13 may be a server.

Fourth Example

FIG. 30 is a block diagram showing a fourth example of a system configuration according to an embodiment of the present disclosure. Referring to FIG. 30, the system 10 includes information processing apparatuses 11*a*, 11 *b*, and 13. The input part 100 is achieved separately by input parts 100*a* and 100*b*. The input part 100*a* is achieved by the information processing apparatus 11*a*. The input part 100*a* may include, for example, the acceleration sensor 101, the gyro sensor 103, the geomagnetic sensor 105, the pressure sensor 107, and/or the GPS receiver 111.

The input part 100*b* and the output part 300 are achieved by the information processing apparatus 11*b*. The input part 100*b* may include the operation input device 109 described above, for example. Further, the processing part 200 is achieved dispersedly between the information processing apparatuses 11*a* and 11*b* and the information processing apparatus 13. The information processing apparatuses 11*a* and 11*b* and the information processing apparatus 13 communicate with each other through a network for achieving a function according to an embodiment of the present disclosure.

As shown in the figure, in the fourth example, the processing part 200 is achieved dispersedly between the information processing apparatuses 11a and 11b and the information processing apparatus 13. To be more specific, the processing part 200 includes a processing part 200a achieved by the information processing apparatus 11a, a processing part 200b achieved by the information processing apparatus 13, and a processing part 200c achieved by the information processing apparatus 11b. The dispersion of the processing part 200 is the same as the third example. However, in the fourth example, since the information processing apparatus 11a and the information processing apparatus 11b are separate devices, the kinds of interfaces included are different between interfaces 250b1 and 250b2. In the case where the processing part 200c includes the information generation part 207 as described above, information from the input part 100b, for example, information from the operation input device 109, is directly provided to the processing part 200c through an interface 150a2.

Note that the fourth example is the same as the second example except that one of or both of the processing part 200a and the processing part 200c is or are achieved by a processor or a processing circuit included in the information processing apparatus 11a or the information processing apparatus 11b. That is, the information processing apparatuses 11a and 11b may each be a terminal device. Further, the information processing apparatus 13 may be a server.

8. HARDWARE CONFIGURATION

Next, with reference to FIG. 31, a hardware configuration of an information processing apparatus according to an embodiment of the present disclosure will be described. FIG. 31 is a block diagram showing a hardware configuration example of an information processing apparatus according to an embodiment of the present disclosure.

An information processing apparatus 900 includes a central processing unit (CPU) 901, read only memory (ROM) 903, and random access memory (RAM) 905. Further, the information processing apparatus 900 may also include a host bus 907, a bridge 909, an external bus 911, an interface 913, an input device 915, an output device 917, a storage device 919, a drive 921, a connection port 923, and a communication device 925. In addition, the information processing apparatus 900 may also include an imaging device 933 and a sensor 935 as necessary. The information processing apparatus 900 may also include, instead of or along with the CPU 901, a processing circuit such as a digital signal processor (DSP), an application specific integrated circuit (ASIC), or a field-programmable gate array (FPGA).

The CPU 901 functions as an arithmetic processing unit and a control unit and controls an entire operation or a part of the operation of the information processing apparatus 900 according to various programs recorded in the ROM 903, the RAM 905, the storage device 919, or a removable recording medium 927. The ROM 903 stores programs and arithmetic parameters used by the CPU 901. The RAM 905 primarily stores programs used in execution of the CPU 901 and parameters and the like varying as appropriate during the execution. The CPU 901, the ROM 903, and the RAM 905 are connected to each other via the host bus 907 configured from an internal bus such as a CPU bus or the like. In addition, the host bus 907 is connected to the external bus 911 such as a peripheral component interconnect/interface (PCI) bus via the bridge 909.

The input device 915 is a device operated by a user, such as a mouse, a keyboard, a touch panel, buttons, a switch, and a lever. Also, the input device 915 may be a remote control device using, for example, infrared light or other radio waves, or may be an external connection device 929 such as a mobile phone compatible with the operation of the information processing apparatus 900. The input device 915 includes an input control circuit that generates an input signal on the basis of information input by the user and outputs the input signal to the CPU 901. The user inputs various kinds of data to the information processing apparatus 900 and instructs the information processing apparatus 900 to perform a processing operation by operating the input device 915.

The output device 917 includes a device capable of notifying the user of acquired information using senses of sight, hearing, touch, and the like. For example, the output device 917 may be: a display device such as a liquid crystal display (LCD) or an organic electro-luminescence (EL) display; an audio output device such as a speaker and headphones; or a vibrator. The output device 917 outputs results obtained by the processing performed by the information processing apparatus 900 as video in the form of a text or an image, as audio in the form of audio or sound, or as vibration.

The storage device 919 is a device for storing data configured as an example of a storage of the information processing apparatus 900. The storage device 919 is configured from, for example, a magnetic storage device such as a hard disk drive (HDD), a semiconductor storage device, an optical storage device, or a magneto-optical storage device. The storage device 919 stores programs to be executed by the CPU 901, various data, and various data obtained from the outside, for example.

The drive 921 is a reader/writer for the removable recording medium 927 such as a magnetic disk, an optical disc, a magneto-optical disk, or a semiconductor memory, and is built in or externally attached to the information processing apparatus 900. The drive 921 reads out information recorded on the attached removable recording medium 927, and outputs the information to the RAM 905. Further, the drive 921 writes the record on the attached removable recording medium 927.

The connection port 923 is a port for allowing devices to connect to the information processing apparatus 900. Examples of the connection port 923 include a universal serial bus (USB) port, an IEEE1394 port, and a small computer system interface (SCSI) port. Other examples of the connection port 923 may include an RS-232C port, an optical audio terminal, and a high-definition multimedia interface (HDMI) (registered trademark) port. The connection of the external connection device 929 to the connection port 923 may enable the various data exchange between the information processing apparatus 900 and the external connection device 929.

The communication device 925 is a communication interface configured from, for example, a communication device for establishing a connection to a communication network 931. The communication device 925 is, for example, a local area network (LAN), Bluetooth (registered trademark), Wi-Fi, a communication card for wireless USB (WUSB), or the like. Alternatively, the communication device 925 may be a router for optical communication, a router for asymmetric digital subscriber line (ADSL), a modem for various communications, or the like. The communication device 925 can transmit and receive signals and the like using a predetermined protocol such as TCP/IP on the Internet and with other communication devices, for example. The communication network 931 connected to the communication device 925 is configured from a network and the like, which is connected via wire or wirelessly, and may include, for example, the Internet, a home-use LAN, infrared communication, radio wave communication, and satellite communication.

The imaging device 933 is a device that images real space using various members including an image sensor such as a complementary metal oxide semiconductor (CMOS) or a charge coupled device (CCD), a lens for controlling image formation of a subject on the image sensor, and the like, and that generates a captured image. The imaging device 933 may image a still image or may image a video.

The sensor 935 is, for example, an acceleration sensor, an angular velocity sensor, a geomagnetic sensor, a light intensity sensor, a temperature sensor, a pressure sensor, or an audio sensor (microphone). The sensor 935 acquires, for example, information related to a state of the information processing apparatus 900 itself, such as the attitude of the housing the information processing apparatus 900, and information related to an ambient environment of the information processing apparatus 900 such as the brightness and noise of the surroundings of the information processing apparatus 900. Further, the sensor 935 may include a GPS receiver that receives global positioning system (GPS) signals and measures latitude, longitude, and altitude of the apparatus.

Heretofore, an example of the hardware configuration of the information processing apparatus 900 has been shown. Each of the structural elements described above may be configured using a general-purpose material, or may be configured from hardware dedicated to the function of each structural element. The configuration may be changed as appropriate according to the technical level at the time of carrying out embodiments.

9. SUPPLEMENT

Embodiments of the present disclosure may include the information processing apparatus, the system, the information processing method executed in the information processing apparatus or the system, the program for causing the information processing apparatus to function, and the non-transitory tangible media having the program recorded thereon, which have been described above, for example.

It should be understood by those skilled in the art that various modifications, combinations, sub-combinations and alterations may occur depending on design requirements and other factors insofar as they are within the scope of the appended claims or the equivalents thereof.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1) An information processing apparatus including:
a processing circuit configured to
obtain activity recognition information which is determined on the basis of sensing information of a plurality of users, the activity recognition information indicating recognized activities of the plurality of users based on location information of the plurality of users, and
generate information for displaying representations of the recognized activities of the plurality of users in relation to a map by using specified criteria.

(2) The information processing apparatus of (1),
wherein the representations of the recognized activities of the plurality of users are displayed as visual information overlaid upon the map.

(3) The information processing apparatus of (1) or (2),
wherein the visual information includes a color map having respective colors designating respective recognized activities.

(4) The information processing apparatus of any of (1) to (3),
wherein the criteria are automatically specified or manually specified by a user.

(5) The information processing apparatus of any of (1) to (4),
wherein the criteria are related to activities, days of the week, time periods, and/or user attributes.

(6) The information processing apparatus of any of (1) to (5),
wherein the user attributes are related to an age, a gender, and/or an occupation.

(7) The information processing apparatus of any of (1) to (6),
wherein the sensing information of the plurality of users includes location information of the plurality of users.

(8) The information processing apparatus of any of (1) to (7),
wherein the representations of the recognized activities of the plurality of users are displayed in correspondence with relative locations on the map in accordance with the location information of the plurality of users.

(9) The information processing apparatus of any of (1) to (8),
wherein the representations of the recognized activities of the plurality of users are displayed as visual information overlaid upon the map.

(10) The information processing apparatus of any of (1) to (9),
wherein the visual information includes a color map having respective colors designating respective recognized activities.

(11) The information processing apparatus of any of (1) to (10),
wherein the visual information includes a pattern map having respective patterns designating respective recognized activities.

(12) The information processing apparatus of any of (1) to (12),
wherein the visual information includes a contour map.

(13) The information processing apparatus of any of (1) to (12),
wherein the representations of the recognized activities are each individually selectable for display or non-display upon the map.

(14) The information processing apparatus of any of (1) to (13),
wherein the representations of the recognized activities are selected for display based on a selection of one or more time ranges for display.

(15) The information processing apparatus of any of (1) to (14),
wherein the sensing information of the plurality of users is provided from the plurality of users as action logs.

(16) The information processing apparatus of any of (1) to (15),
wherein a plurality of action logs each corresponding to a different time period are provided from a single user of the plurality of users.

(17) The information processing apparatus of any of (1) to (16),
wherein the sensing information of each one of the plurality of users includes information obtained from at least one sensor.

(18) The information processing apparatus of any of (1) to (17),
wherein the sensing information of each one of the plurality of users includes information obtained from at least one of an acceleration sensor, a gyro-sensor, a geomagnetic sensor, a light intensity sensor, a temperature sensor, and a pressure sensor.

(19) An information processing method including:
obtaining activity recognition information which is determined on the basis of sensing information of a plurality of users, the activity recognition information indicating recognized activities of the plurality of users based on location information of the plurality of users;
generating information for displaying representations of the recognized activities of the plurality of users; and
displaying the representations in relation to a map, based on the generated information and by using specified criteria.

(20) A non-transitory computer-readable medium having embodied thereon a program, which when executed by a computer causes the computer to execute an information processing method, the method including:
obtaining activity recognition information which is determined on the basis of sensing information of a plurality of users, the activity recognition information indicating recognized activities of the plurality of users based on location information of the plurality of users; and
generating information for displaying representations of the recognized activities of the plurality of users in relation to a map by using specified criteria.

(21)
An information processing apparatus including:
a processing circuit configured to achieve
an action log acquisition function of acquiring at least one action log including position information and action recognition information of a user associated with the position information, and
an information generation function of generating information obtained by placing information based on the action recognition information on a map generated on the basis of the position information.

(22)
The information processing apparatus according to (21),
wherein the information generation function generates information for displaying, on the map, an image expressing a score of an action indicated by the action recognition information.

(23)
The information processing apparatus according to (22),
wherein the at least one action log includes a plurality of action logs provided by different users or provided at different times, and
wherein the score corresponds to a frequency of an action indicated by the action recognition information associated with the position information indicating same positions or positions close to each other in the plurality of action logs.

(24)
The information processing apparatus according to (22) or (23),
wherein the information generation function generates information for displaying, on the map, an image expressing the score by a heat map or a contour map.

(25)
The information processing apparatus according to any one of (21) to (24),
wherein the processing circuit further achieves a map generation function of generating the map on the basis of the position information.

(26)
The information processing apparatus according to (25),
wherein, in a case where the position information includes a plurality of groups of position information having different altitudes, the map generation function generates the map which is divided for each group of position information.

(27)
The information processing apparatus according to (25) or (26),
wherein the map generation function divides the map on the basis of external map information or information specified by a user.

(28)
The information processing apparatus according to any one of (25) to (27),
wherein the map generation function generates the map further on the basis of the action recognition information.

(29)
The information processing apparatus according to (28),
wherein the map generation function generates the map which is divided using as a reference a position indicating that an action associated with building equipment has occurred by the action recognition information.

(30)
The information processing apparatus according to (29),
wherein the building equipment includes raising and lowering equipment or gateway equipment.

(31)
The information processing apparatus according to any one of (28) to (30),
wherein the map generation function generates the map which is divided between positions in which states each indicating an action of a user for each position are not similar to each other, the states being defined on the basis of the position information and the action recognition information.

(32)
The information processing apparatus according to (31),
wherein whether the states are similar to each other is determined by a similarity function generated by learning the position information and the action recognition information.

(33)
An information processing method including:
acquiring at least one action log including position information and action recognition information of a user associated with the position information; and
generating, by a processing circuit, information obtained by placing information based on the action recognition information on a map generated on the basis of the position information.

(34)
A program for causing a processing circuit to achieve
an action log acquisition function of acquiring at least one action log including position information and action recognition information of a user associated with the position information, and
an information generation function of generating information obtained by placing information based on the action recognition information on a map generated on the basis of the position information.

REFERENCE SIGNS LIST 10 system
11, 13 information processing apparatus
100 input part
101 acceleration sensor
103 gyro sensor
105 geomagnetic sensor
107 pressure sensor
109 operation input device
111 GPS receiver
150, 250, 350 interface
200 processing part
201 autonomous positioning part
203 action recognition part
205 integration analysis part
207 information generation part
211 position information acquisition part
300 output part
301 display
303 speaker
305 vibrator

The invention claimed is:

1. An information processing apparatus comprising:
a processing circuit configured to
obtain a plurality of criteria directed to an activity recognition information received from a plurality of sensors configured to detect information related to a plurality of users to determine an activity model, wherein the activity recognition information includes combinations of location information and activities of the plurality of users,
generate an overlay visualization of the activities upon a map based on the location information, and
select a criteria of a user of the plurality of users using the activity model to determine a score for the selected criteria,
wherein the score specifies an observation probability of a position of a state of the user and an observation probability of an action in the state,
wherein the score expresses the activities of the user in the overlay visualization on the map, and
wherein the activity model is defined by the state of the user, the observation probability of the position of the state, the observation probability of the action in the state, and a transition probability between states.

2. The information processing apparatus according to claim 1, wherein the plurality of criteria are automatically specifiable or manually specifiable by a user.

3. The information processing apparatus according to claim 2, wherein the plurality of criteria are related to at least one of activities, days of the week, time periods, or user attributes.

4. The information processing apparatus according to claim 3,
wherein the plurality of criteria are related to at least one of the user attributes, and
wherein the user attributes are related to at least one of an age, a gender, or an occupation.

5. The information processing apparatus according to claim 1,
wherein the activity recognition information is determined based on sensing information of the plurality of users, and
wherein the sensing information of the plurality of users comprises the location information of the plurality of users.

6. The information processing apparatus according to claim 5, wherein the overlay visualization of the activities of the plurality of users are displayed in correspondence with relative locations on the map in accordance with the location information of the plurality of users.

7. The information processing apparatus according to claim 5, wherein the sensing information of the plurality of users is provided from the plurality of users as action logs.

8. The information processing apparatus according to claim 7, wherein a plurality of action logs each corresponding to a different time period are provided from a single user of the plurality of users.

9. The information processing apparatus according to claim 5, wherein the sensing information of each one of the plurality of users comprises information obtained from at least one sensor.

10. The information processing apparatus according to claim 5, wherein the sensing information of each user of the plurality of users comprises information obtained from at least one of an acceleration sensor, a gyro-sensor, a geomagnetic sensor, a light intensity sensor, a temperature sensor, or a pressure sensor.

11. The information processing apparatus according to claim 1, wherein the activity recognition information indicates patterns that occur in response to activity related to at least one of a staircase, an elevator, or an escalator.

12. The information processing apparatus according to claim 1, wherein the activity recognition information indicates patterns related to at least one of a car, bus, or a train transportation mode of the plurality of users.

13. The information processing apparatus according to claim 1, wherein the overlay visualization comprises a pattern map having respective patterns designating respective recognized activities.

14. The information processing apparatus according to claim 1, wherein the overlay visualization comprises a contour map.

15. The information processing apparatus according to claim 1, wherein the overlay visualization of the activities are each individually selectable for display or non-display upon the map.

16. The information processing apparatus according to claim 1, wherein the overlay visualization of the activities are selected for display based on a selection of one or more time ranges for display.

17. An information processing method comprising:
obtaining a plurality of criteria directed to an activity recognition information received from a plurality of sensors configured to detect information related to a plurality of users to determine an activity model, wherein the activity recognition information includes combinations of location information and activities of the plurality of users;
generating an overlay visualization of the activities upon a map based on the location information; and
selecting a criteria of a user of the plurality of users using the activity model to determine a score for the selected criteria,
wherein the score specifies an observation probability of a position of a state of the user and an observation probability of an action in the state, and
wherein the score expresses the activities of the user in the overlay visualization on the map, and
wherein the activity model is defined by the state of the user, the observation probability of the position of the state, the observation probability of the action in the state, and a transition probability between states.

18. A non-transitory computer-readable medium having embodied thereon a program, which when executed by a computer causes the computer to execute an information processing method, the method comprising:

obtaining a plurality of criteria directed to an activity recognition information received from a plurality of sensors configured to detect information related to a plurality of users to determine an activity model, wherein the activity recognition information includes combinations of location information and activities of the plurality of users;

generating an overlay visualization of the activities upon a map based on the location information; and selecting a criteria of a user of the plurality of users using the activity model to determine a score for the selected criteria, wherein the score specifies an observation probability of a position of a state of the user and an observation probability of an action in the state, and wherein the score expresses the activities of the user in the overlay visualization on the map, and wherein the activity model is defined by the state of the user, the observation probability of the position of the state, the observation probability of the action in the state, and a transition probability between states.

\* \* \* \* \*